(12) United States Patent
Fukui

(10) Patent No.: US 9,415,910 B2
(45) Date of Patent: Aug. 16, 2016

(54) TWO-WAY-OPENING STORAGE BOX

(71) Applicant: TOYODA GOSEI CO., LTD., Aichi-ken (JP)

(72) Inventor: Naoyuki Fukui, Aichi-ken (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 151 days.

(21) Appl. No.: 13/791,571

(22) Filed: Mar. 8, 2013

(65) Prior Publication Data

US 2013/0270286 A1 Oct. 17, 2013

(30) Foreign Application Priority Data

Apr. 16, 2012 (JP) ................. 2012-092987

(51) Int. Cl.
*B65D 43/14* (2006.01)
*B65D 51/00* (2006.01)
*B60R 7/04* (2006.01)

(52) U.S. Cl.
CPC .. *B65D 51/00* (2013.01); *B60R 7/04* (2013.01)

(58) Field of Classification Search
CPC ........ E05D 15/505; E05D 15/50; E05B 83/32
USPC .............. 220/811, 812, 817; 296/24.34, 37.8, 296/188.19; 49/193
See application file for complete search history.

(56) References Cited

U.S. PATENT DOCUMENTS

| 4,934,750 | A | * | 6/1990 | Eichler et al. ................. 296/37.8 |
| 5,357,652 | A | * | 10/1994 | Yamada ........................... 16/232 |
| 5,546,705 | A | * | 8/1996 | Hirtsiefer ........................ 49/386 |
| 5,931,336 | A | | 8/1999 | Takeuchi |
| 6,250,729 | B1 | * | 6/2001 | Allison et al. ................. 312/324 |

FOREIGN PATENT DOCUMENTS

| JP | 05-338496 A | 12/1993 |
| JP | 06-055977 A | 3/1994 |
| JP | 07-172452 A | 7/1995 |
| JP | 3292038 B2 | 6/2002 |
| JP | 2009-138407 A | 6/2009 |
| JP | 2010-070132 A | 4/2010 |
| JP | 2010235123 A | 10/2010 |
| JP | 2011-088620 A | 5/2011 |

* cited by examiner

*Primary Examiner* — Jeffrey Allen
(74) *Attorney, Agent, or Firm* — Posz Law Group, PLC

(57) ABSTRACT

A two-way-opening storage box includes a box body, a lid, a link mechanism, and a restrictor. The lid includes a base member, and a movable member. The base member covers the box body. The movable member is held onto the base member slidably. The restrictor is disposed in at least one of the base member and the movable member, and is capable of restricting the link mechanism from being actuated under such a condition as the movable member has fully slid, and/or under such another condition as the movable member is sliding 8 Claims, 16 Drawing Sheets

TWO-WAY-OPENING STORAGE BOX

INCORPORATION BY REFERENCE

The present invention is based on Japanese Patent Application No. 2012-092987, filed on Apr. 16, 2012, the entire contents of which are incorporated herein by reference.

BACKGROUND OF THE INVENTION

1. Field of the Invention

The present invention relates to a lidded storage box, such as console boxes. More specifically, the present invention relates to a two-way-opening (or dually-opening) storage box whose lid is openable and closable from both of the sides, namely, from the right and left, or from the front and rear.

2. Description of the Related Art

A two-way-opening box is available in which the lid is opened and closed from the right and left opposite sides with use of a link mechanism. For example, Japanese Patent Gazette No. 3292038 discloses a conventional storage box in which a pair of hinge pins extending in the front/rear direction are disposed at the opposite ends of the lid in the right/left direction; and the paired hinge pins engage at the opposite ends with, pin holes that are formed in the box body. Moreover, in the storage box, the paired hinge pins are divided into two elements, respectively. In addition, the divided elements are provided with switches for swinging that make a pair in the right/left direction. Moreover, the right/left paired switches for swinging are connected with each other by a bridge-shaped member that crosses orthogonally with the front/rear extending direction of the hinge pins.

When a user pushes the left-side switch for swinging, for instance, the above-descried two-way-opening conventional storage box opens in the following manner: the left-side divided hinge pin, which has been engaged with the left-side switch for swinging, moves so that the divided elements approach one another at the division; and then the hinge pin disengages from the left-side pin hole; as a consequence, the lid swings about the right-side hinge pin serving as the center to open the conventional storage box from the left side. On the other hand, when a user pushes the right-side switch for swinging, the conventional storage box opens in the following manner: the right-side divided hinge pin, which has been engaged with the right-side switch for swinging, moves so that the divided elements approach one another at the division; and then the hinge pin disengages from the right-side pin hole; as a consequence, the lid swings about the left-side hinge pin serving as the center to open the conventional storage box from the right side. Such a conventional two-way-opening storage box has been installed in the center console of vehicle, for instance.

In a storage box as described above, it is desirable to decelerate a closing speed of the lid when a user closes the lid that has been swung in the right direction or in the left direction. This is desirable because noises have become louder when the lid collides with the box body, if the closing speed is faster. When the lid opens in one of the right and left directions alone, it is possible to employ one and only decelerator, which utilizes a gear mechanism and a damper, around the swing shaft. However, since it should be necessary to provide the conventional two-way-opening storage box with a decelerator around the right and left swing shafts, respectively, such a constitutional design is disadvantageous in view of space, and in view of strength.

Incidentally, it has been desired recently, not only to open the lid from the right and left opposite sides, but also to slide the lid in the forward or rear direction in order to open the storage section in the box body on the front or rear side. In particular, it has been demanded for a console box of vehicle to slide the lid rearward in order to open the storage section in the box body on the front side. Moreover, it has been common to dispose the above-described switch for swinging on the front side of the lid. However, when it is intended to provide the conventional storage box disclosed in Japanese Patent Gazette No. 3292038 with a lid that is capable of sliding, it has been difficult to provide the conventional storage box with an opening on the front side because the bridge-shaped member exists to connect the right/left paired switches for swinging with each other.

Hence, Japanese Unexamined Patent Publication (KO-KAI) Gazette No. 2010-235123 proposes a two-way-opening storage box in which the lid is made openable and closable to both of the right/left opposite sides by devising a link mechanism without disposing any bridge-shaped, member that connect the right/left paired, switches for swinging therein. This second conventional storage box is convenient for users, because they can make an opening on the front side when they slide the lid.

In the second conventional two-way-opening storage box disclosed in Japanese Unexamined Patent Publication (KO-KAI) Gazette No. 2010-235123, however, if a user should have touched one of the right/left paired switches for swinging inadvertently, the locking of the lid with the switch might have been canceled so that the lid might possibly open to the right side, or to the left side, accidentally in such a circumstance as the user is in the process of sliding the lid, or even in such another circumstance as the user has slid the lid to make an opening appear. If the thus slid lid should have opened to the right or left side, the lid does not look nice to the user because the internal construction of the lid is visible to him or her from the back-face side. Consequently, it is needed to provide the lid with a cover for masking that has resulted in increasing the quantity of component parts. Moreover, fears of breaking the thus slid lid might also possibly have arisen because the lid would have been subjected to loads that act from different directions than the ordinary directions.

Moreover, although the second conventional two-way-opening storage box disclosed in Japanese Unexamined Patent Publication (KOKAI) Gazette No. 2010-235123 comprises the sliding lid, the lid is constructed complicatedly. Accordingly, it might be difficult to dispose a decelerator inside the lid. Moreover, the complicatedly constructed lid has an increased weight. Consequently, the lid might be disadvantageous for the deceleration when closing it.

Incidentally, in the second conventional two-way-opening storage box disclosed in Japanese Unexamined Patent Publication (KOKAI) Gazette No. 2010-235123, the lid comprises a base member covering the storage section, and a movable member covering the base member. The movable member slides with respect to the base member. Moreover, the movable member is provided with a sliding button, which enables the movable member to slide, on the front end face. A user presses the slide button with his or her hand or finger to cancel the locking between the movable member and the base member. Then, the user slides the movable member rearward to open the storage section by way of an opening that is formed, in the base member.

In the thus constructed second conventional two-way-opening storage box, locking the movable member with the base member has been demanded in order to inhibit an accelerating and decelerating vehicle from moving the movable member even at a position where the movable member has fully slid. Hence, Japanese Unexamined Patent Publication (KOKAI) Gazette No. 2010-235123 discloses a locking structure. The locking structure is provided with a locking pin that engages with the sliding button. The locking pin engages with the base member when a user cancels or stops pressing the sliding button at a position where the movable member has fully slid. Then, when the user represses the sliding button to cancel the locking between the locking pin and the base member, "CONSTON SPRING"™, one of constant-load springs, with which the movable member is provided, slides the movable member automatically to close the opening in the base member.

However, in the above-desorbed locking structure, the pressing direction of the sliding button coincides with the direction in which the movable member slides to open. Moreover, the movable member usually slides slightly excessively beyond a lock position at which it is locked by the locking pin, in order to prevent a user from sensing the bumping movable member. Consequently, when a user presses the sliding button at a slid-open position, the locking pin, which has been released from locking with the base member, slides slightly excessively, together with the movable member. Under the circumstance, if the user should have released or stopped pressing the sliding button inadvertently, the locking pin would have reengaged with the base member accidentally. As a result, the lid might have possibly operated faultily to stop moving when "CONSTON SPRING" slides the movable member automatically.

SUMMARY OF THE INVENTION

The present invention has been developed in view of the circumstances as described above. It is therefore an object of the present invention to provide a two-way-opening storage box that not only enables the lid to slide but also makes it possible to reliably inhibit the lid from swinging either to the right side, or to the left side, to open under such a condition as the lid has fully slid, or under such another condition as the lid is sliding.

Moreover, it is another object of the present invention to provide a two-way-opening storage box that can decelerate a speed at the time of closing the lid.

In addition, it is still another object of the present invention to provide a two-way-opening storage box in which behaviors of the lid from the slid condition to the locked condition are improved in order to prevent a locking pin from reengaging with a base member of the lid.

For example, a two-way-opening storage box according to the present invention, which achieves the aforementioned objects, comprises:

a box body with a storage section being provided therein;

a lid being capable of swinging, thereby enabling itself to open and close the storage section from an opposite-end side of the storage section, or from another opposite-end side thereof, in a first direction;

the lid including a base member covering the storage section, and a movable member covering the base member;

a link mechanism being disposed between opposite ends of the base member in a second direction, which differs from the first direction, as well as between opposite ends of the box body in the second direction, the link mechanism, being capable of selectively swinging the lid either to the opposite-end side in the first direction, or to the other opposite-end side therein, with respect to the box body;

the movable member being held onto the base member slidably in the second direction; and a restrictor being disposed in at least one of the base member and the movable member, the restrictor being capable of restricting the link mechanism from being actuated under such a condition as the movable member has fully slid, and/or under such another condition as the movable member is sliding.

In accordance with the two-way-opening storage box according to the present invention, a restrictor restricts the link mechanism from being actuated under such a condition as the movable member of the lid has fully slid, and/or under such another condition as the movable member is sliding. Accordingly, the lid is prevented from swinging in the first direction when the movable member has fully slid, or when the movable member is sliding. Consequently, no such a trouble occurs as the inner structure of the lid is visible to a user from the rear-face side. Therefore, the quantity of component parts can be reduced, because no such a cover for masking is needed. Moreover, no loads act to the lid, which has fully slid, from directions other than the ordinary directions.

It is preferable that the two-way-opening storage box according to the present invention can further comprise a decelerator being disposed at one of the opposite ends of the lid in the second direction, as well as at one of the opposite ends of the box body in the second direction, the decelerator being capable of decelerating a moving speed of the lid that swings in a closing direction. If such is the case, it is possible to alleviate noises that result from collisions between the box body and the lid when closing the fully-swung lid.

In addition, it is preferable that the two-way-opening storage box according to the present invention can comprise the movable member of the lid that includes a sliding lock, and a sliding button, the sliding lock being capable of engaging with the base member of the lid at a slid-close position at which the movable member covers the storage section, in the box body as well as at a slid-open position at which the movable member opens the storage section partially in order to restrict the movable member from sliding at the slid-close position, and at the slid-open position, the sliding button being capable of releasing the sliding lock from locking with the movable member; and that the present two-way-opening storage box can further comprise a circumventer, the circumventer being capable of releasing the sliding lock from locking with the movable member when the sliding button is pressed at the slid-open position, thereby circumventing the sliding lock from reengaging with the base member when the pressed sliding button is subsequently released from the pressing.

In accordance with the two-way-opening storage box according to the present being constructed as described above, the circumventer circumvents the sliding lock from reengaging with the base member of the lid when a user presses the sliding button at the slid-open position to release the sliding lock from locking with the movable member and subsequently releases the sliding button inadvertently from being pressed. Therefore, it is possible to make an urging means slide the movable member of the lid smoothly in a base-covering direction, without ever causing such a trouble as locking the sliding lock with the base member accidentally.

BRIEF DESCRIPTION OF THE DRAWINGS

A more complete appreciation of the present invention and many of its advantages will be readily obtained as the same becomes better understood by reference to the following detailed description when considered in connection with the accompanying drawings and detailed specification, all of which forms a part of the disclosure.

FIG. 14 is a major planar diagram for illustrating a first restrictor in the present console box according to Embodiment No. 1 in which the first restrictor is seen through.

FIG. 15 is a major planar diagram for illustrating a second restrictor in the present console box according to Embodiment No. 1 in which the second restrictor is seen through.

FIG. 2 4 is another major cross-sectional diagram for illustrating how the circumventer operates in the present console box according to Embodiment No. 3.

DETAILED DESCRIPTION OF THE PREFERRED EMBODIMENTS

Figure 1:
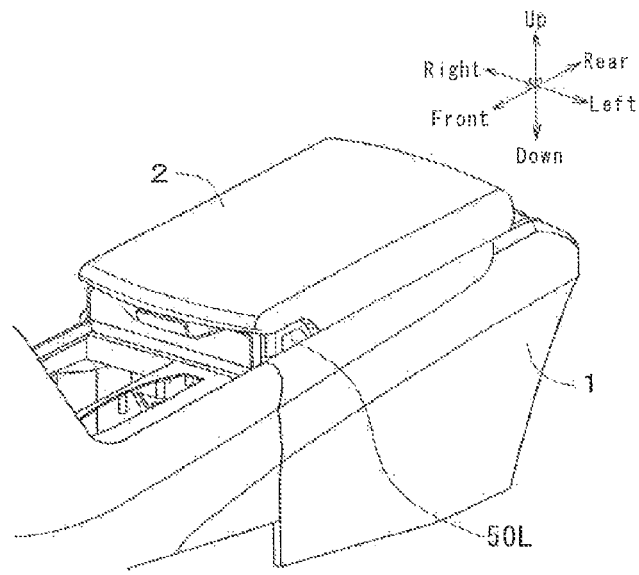
FIG. 1 is a perspective diagram for illustrating a console box according to Embodiment No. 1 of the present invention under the non-use condition.

Having generally described the present invention, a further understanding can be obtained by reference to the specific preferred embodiments which are provided herein for the purpose of illustration only and not intended to limit the scope of the appended claims.

A two-way-opening storage box according to the present invention comprises a box body, and a lid. The lid includes a base member, and a movable member. The base member covers a storage section in the box body. The movable member covers the base member. The lid is disposed swingably onto the box body, thereby enabling itself to open and close the storage section from an opposite-end side of the storage section, or from another opposite-end side thereof, in a first direction. Note herein that the "first direction" refers to a swinging direction of the lid. For example, when the present two-way-opening storage box opens to both of the right and left side, the "first direction" refers to the right/left direction, whereas the "first direction" refers to the front/rear direction when the present two-way-opening storage box opens to both of the front and rear sides.

A link mechanism is disposed between the opposite ends of the base in a second direction that differs from the first direction, as well as between the opposite ends of the box body in the second direction. The link mechanism is capable of swinging the lid either to one of the opposite-end sides in the first direction, or to the other one of the opposite-end sides in the first direction, with respect to the box body. Note herein that the "second direction" refers to a direction that is different from the first direction. In general, however, the "second direction" is a direction that is orthogonal to the first direction. For example, the front/rear direction, can make the "second direction" when the first direction is the right/left direction, whereas the right/left direction can make the "second, direction" when the first direction is the front/rear direction. Therefore, when the first direction is the right/left direction, a link mechanism is disposed to extend between the opposite ends of the base member in the front/right direction (i.e., in the second direction), as well as between the opposite ends of the box body in the front/rear direction (i.e., in the second direction) The link mechanism is capable of selectively (or alternately) swinging the lid either to one of the opposite ends in the right/left direction (i.e., in the first direction), or to the other of the opposite ends in the right/left direction (i.e., in the first direction), with respect to the box body.

It is possible to employ various publicly-know constituent, elements for the link mechanism. However, it is preferable that the link mechanism can comprise a push-button switch for swinging, a front locking pin, and a rear locking pin. The switch for swinging is disposed in the base member of the lid. The front locking pin engages with the switch for swinging, and extends in the second direction. The rear locking pin extends in the second direction. Each of the front locking pin and rear locking pin further engages with a locking hole that is disposed respectively in the box body. The front locking pin and rear locking pin are capable of moving so as to approach one another in the second direction and thereby disengaging from the locking hole when the switch for swinging is pressed. If such is the case, the front locking pin and rear locking pin engage with a locking hole, with which the box body is provided, respectively. Then, when the switch for swinging is pressed, the pressed switch moves the front locking pin and rear locking pin so as to approach one another in the second direction. As a result, the front locking pin and rear locking pin sir e released from locking with the locking hole, respectively, and thereby the lid can swing in the first direction.

Since the link mechanism is disposed art both of the opposite ends in the first direction, respectively, the lid is made so as to swing to one of the opposite ends in the first direction, or to the other one of the opposite ends in the first direction, alternately. Moreover, constructing the above-described locking-pin structure makes it possible to lay out the link mechanism so as to come along an edge of the box body in the second direction, and makes it possible to enlarge an opening area of the storage section.

It is more preferable that the link mechanism, can further include a switcher that is capable of switching swinging directions ions of the lid so as to alternately swing the lid from one of the opposite-end sides to the other of the opposite-end side, or vice versa, in the first direction. The link mechanism including such a switcher enables the lid to circumvent from separating the box body. Such a switcher can be made of a mechanism that keeps the engagement between the locking hole and the front locking pin and rear locking pin at one of the opposite ends in the first direction when the engagement between the locking hole and the first and rear locking pin is disengaged, at the other one of the opposite ends in the first direction, for instance. For example, as illustrated in one of later-described embodiments, it is possible to dispose a connecting rod, which engages with the locking pin at one of the opposite ends and engages with the locking pin at the other one of the opposite ends, in order to make a switcher.

Moreover, the lid comprises the movable member that is held slidably to the base member in the second direction. The thus constructed lid makes it possible to expose an opening, which communicates with the storage section, by simply sliding the movable member when the base member is provided with the opening. Consequently, it is possible for a user to make use of the storage section without ever swinging the lid. When the present two-way-storage box makes a console box, it is preferable that the movable member, which slides to the rear of vehicle, can expose an opening in a forward side of the box body in order to let a passenger on the driver's seat or navigator's seat utilize the console box.

Taking the operability of a passenger on the driver's seat or navigator's seat into consideration, it is preferable to dispose the push-button switch for swinging in a vehicular forward side of the console box. If such is the case, however, it might be difficult to expose an opening in a vehicular forward side of the box body, because the link mechanism, which is connected with the push-button switch for swinging, might possibly be present in the opening.

Hence, it is more preferable to use, as part of the link mechanism, a front locking pin that engages with the switch for swinging and extends in the second direction, and a rear locking pin that extends in the second direction, as described above. The front locking pin and rear locking pin make it possible to dispose the connecting rod more rearward than is the push-button switch for swinging by designing the division between the first locking pin and t h e rear locking pin rearward. Thus, it is possible to make an opening appear in a vehicular forward side of the box body.

At least one of the base member and movable member is provided with a restrictor that restricts the link mechanism from being actuated under such a condition as the movable member has fully slid, and/or under such another condition as the movable member is sliding. When the movable member has fully slid, and/or when the movable member is sliding, the restrictor prevents the lid from, swinging in the first direction to open the storage section.

When the link mechanism includes the above-described front and rear locking pins, it is possible to construct the restrictor so as to engage with the movable member to restrict the front and rear locking pins from moving. For example, the restrictor can be made of a sliding locking pin that enters a hole, with which the front locking pin or the rear locking pin is provided, when being pressed through the movable member that has been pressed. Note that, in order to enhance stability of the restrictor in the actuation, it is more preferable that the opposite ends of the base member in the first direction can be provided with the restrictor. respectively.

The two-way-opening storage box according to the present invention can preferably further comprise a decelerator that is disposed at one of the opposite ends of the base member in the second direction, as well as at one the opposite ends of the box body in the second direction, and which is capable of decelerating a moving speed of the lid that swings in a closing direction. Although the decelerator can be made of a gear assembly with a damper, such a decelerator might possibly exert loads to the swing shaft of the lid excessively. Hence, it is more preferable that the decelerator can comprise: an arm having opposite ends, one of the opposite ends being retained rotatably onto a substantial middle in one of the opposite ends of the base member in the second direction; an arm case being retained rotatably onto a substantial middle in one of the opposite ends of the box body in the second direction, and accommodating the other one of the opposite ends of the arm therein; and a damper being disposed in the arm case, and engaging with the arm, thereby decelerating a moving speed of the arm.

Since the thus constructed decelerator receives loads being exerted to the lid at the opposite ends of the arm, the accelerator can disperse the exerted loads. Therefore, even when the lid has a large weight, the decelerator can decelerate a moving speed upon closing the heavy lid, so that it is possible to reduce abnormal noises. Moreover, even when the lid makes a sliding structure comprising the base member and the movable member, disposing the arm between the base member and the box body makes it possible to dispose the decelerator without ever interfering with the sliding movable member.

Moreover, it is even much more preferable that the arm and arm case can make such a structure in which at least one of the arm and arm case is provided with a protrusion and the other one of the arm and arm case goes over the protrusion when the arm moves within the arm case. For example, when the arm and arm case make such a construction in which the other one of them goes over the protrusion immediately before the lid is fully opened, the structure not only gives a user a sense of clicking upon the going-over, but also prevents the lid from flip-flopping. As a result, the two-way-opening storage box according to the present invent ion upgrades in terms of durability.

In addition, it is even much more that the damper in the decelerator can be provided with a spring meshing with a rack, with which the arm is provided, by way of an intermediate gear, and being capable of storing an urging force in the intermediate gear when the lid moves in the closing direction. The damper with such a spring provided enables the lid to swing automatically by the spring's urging action, and enables the resulting urging force of the spring to assist the swinging lid.

Moreover, in the two-way-opening storage according to the present invention, the movable member of the lid can preferably include: a sliding lock being capable of engaging with the base member of the lid at a slid-close position at which the movable member covers the storage section in the box body as well as at a slid-open position at which the movable member opens the storage section partially in order to restrict the movable member from sliding at the slid-close position, and at the slid-open position, and a sliding button being capable of releasing the sliding lock from locking with the movable member; and the present two-way-opening storage can preferably further comprise a circumventer being capable of releasing the sliding lock from locking with the movable member when the sliding button is pressed at the slid-open position, thereby circumventing the sliding lock from reengaging with the base member when the pressed sliding button is subsequently released from the pressing.

In addition, the circumventer can more preferably be constructed in the following manner: the sliding lock detaches from a locking bore, with which the base member of the lid is provided, as the sliding button is pressed, thereby being released from locking with the movable member of the lid; the movable member slides at the slid-open position by a predetermined over/stroke in the second direction; and the base member includes a wall with which the sliding button comes into contact directly or indirectly. Moreover, the sliding button can desirably designed so that it moves at the slid-open position by a magnitude, which is greater than the over stroke of the movable member, from a time when pressing the sliding button is started until another time when the sliding button comes into contact with the wall.

When the sliding button is pressed rearward at the slid-open position, the sliding button moves by a predetermined stroke, and then comes into contact with the wall at the rear end. Under the circumstance, the sliding lock has come off from the locking hole completely. On this occasion, an interval between the rear-end face of the sliding lock and the rear-end face of the locking hole makes the overstroke of the movable member. Accordingly, the movable member slides by the overstroke, but the sliding button cannot move because the rear end comes into contact with the wall. Consequently, the sliding button, moves forward against the pressing by a difference between the predetermined stroke of the sliding button and the overstroke of the movable member. Therefore, under the circumstance, when the sliding button is released from the pressing, the urging action of an urging member makes it possible to make a movement magnitude, which is necessary for the sliding lock to be free from within the range of the locking hole, smaller than it has been heretofore designed conventionally. All in all, it is possible to prevent the sliding lock from reengaging with the locking hole.

EMBODIMENTS

Hereinafter, descriptions will be made in detail on modes for embodying the present invention with reference to the following specific embodiments.

Embodiment No. 1

FIGS. 1 through 4 illustrate a console box according to Embodiment No. 1 of the present invention. The present console box is put in place in a vehicle's center console, and comprises a box body 1, and a lid 2. The box body 1 includes a storage section 10, and a tray 11. The storage section 10 is put in place inside the box body 1. The tray 11 is put in place detachably on the vehicular front side of the storage section 10.

Figure 2:
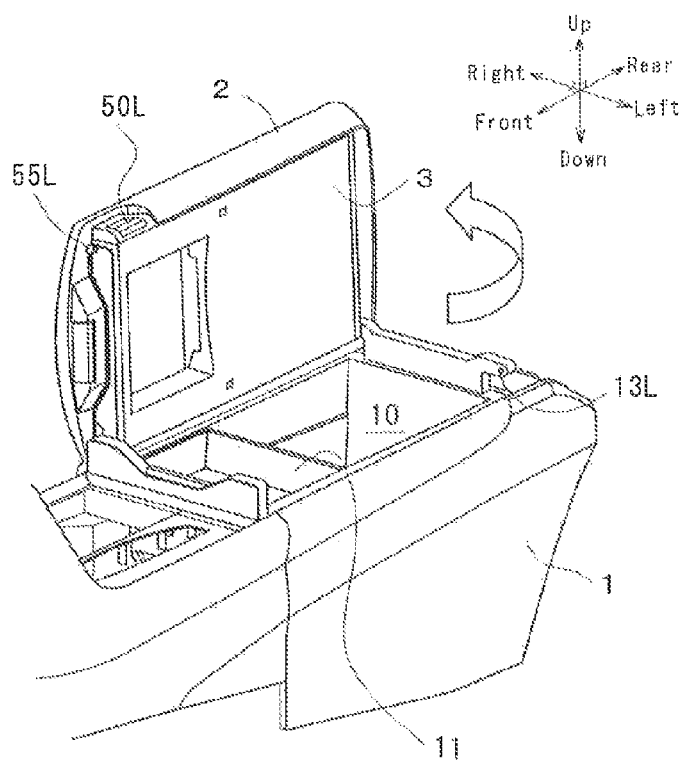
FIG. 2 is a perspective diagram for illustrating the present console box according to Embodiment No. 1 under such a condition as the lid has swung to the right.
Figure 3:
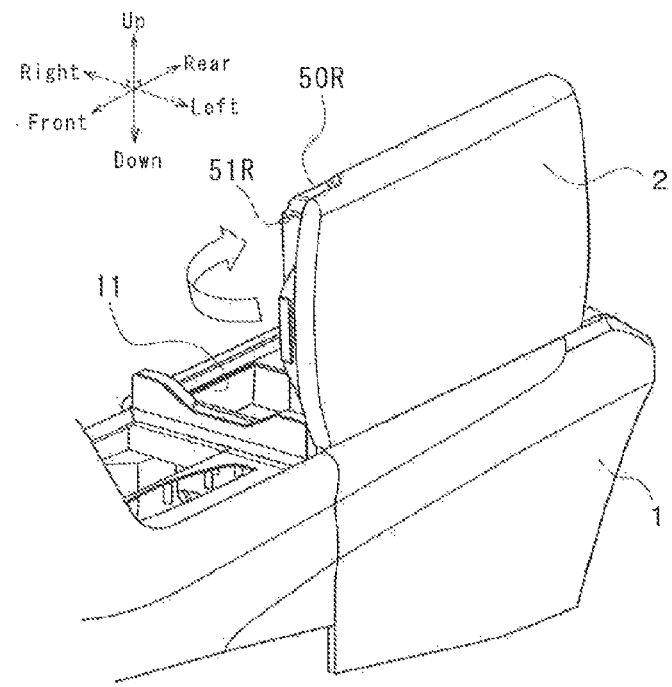
FIG. 3 is a perspective diagram for illustrating the present console box according to Embodiment No. 1 under such a condition as the lid has swung to the left.
Figure 4:
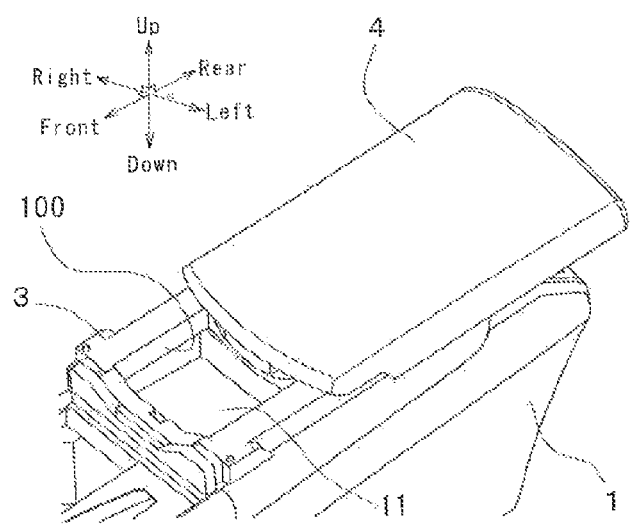
FIG. 4 is a perspective diagram for illustrating the present console box according to Embodiment No. 1 under such a condition as the lid has slid rearward.

As illustrated in FIG. 4, the lid 2 comprises a base member 3 covering the storage section 10, and a movable member 4 covering the base member 3. The movable member 4 is retained onto the base member 3 slidably in the front/rear direction by way of not-shown rails. The base member 3 is retained swingably onto the box body 1 at each of the right and left side ends. As illustrated in FIGS. 2 and 3, the lid 2 swings alternately to the right or left to open the storage section 10. Moreover, when the movable member 4 slides rearward under such a condition as the lid 2 does not at all swing to close the storage section 10, an opening 100, which is formed in the base member 3, is exposed so that a user can make use of the storage section 10 or the tray 11 through the opening 100. Note that the front/rear direction coincides with the vehicle's front/rear direction, the right/left direction coincides with the vehicle's right/left direction (or widthwise direction), and the up/down direction coincides with the vehicle's up/down direction.

Hereinafter, descriptions will be made in detail on how the present console box according to Example No. 1 is constructed.

Figure 5:
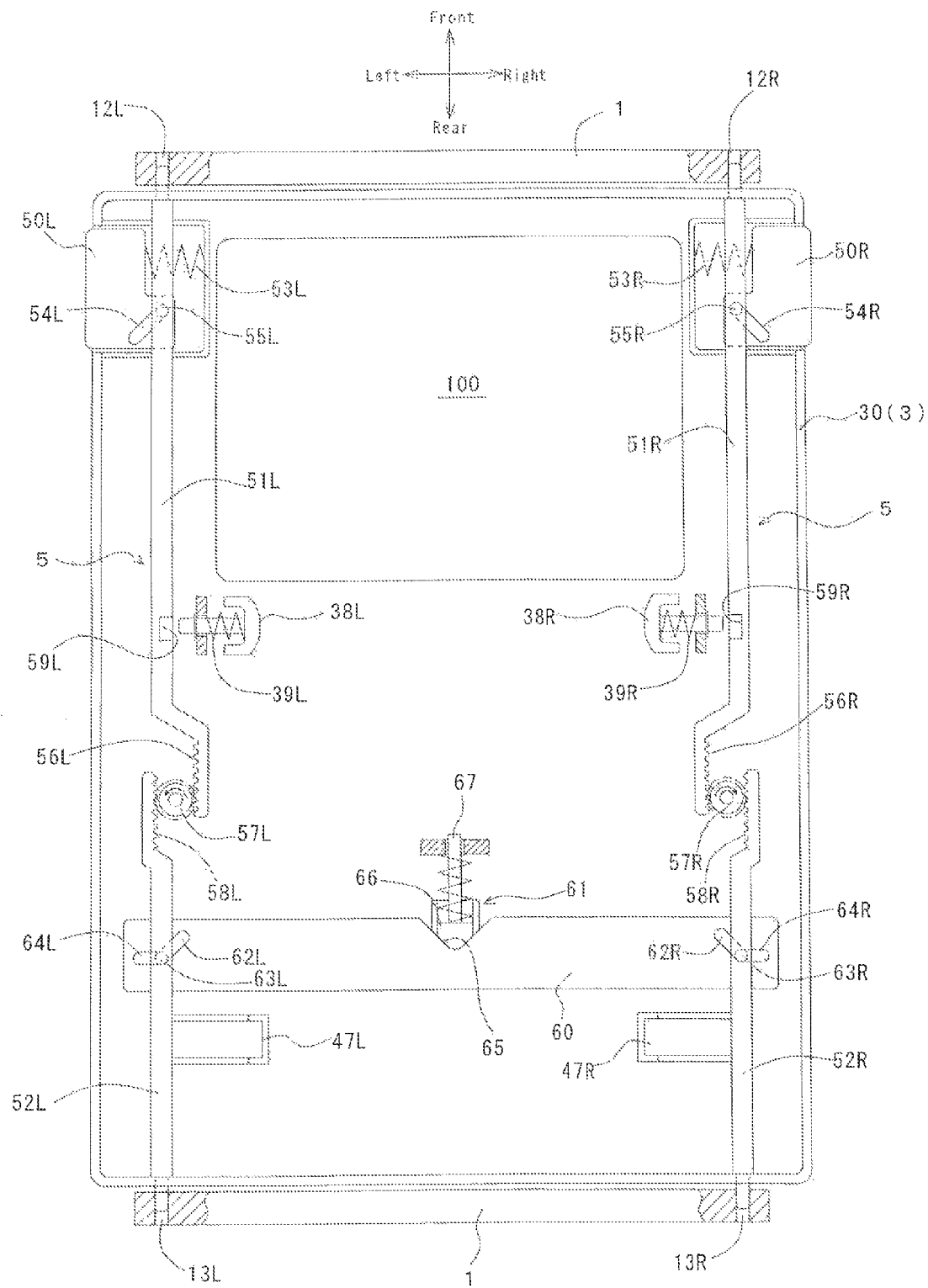
FIG. 5 is a planar diagram for illustrating a lower component of the lid's base member in the present console box according to Embodiment No. 1 under the non-use condition.
Figure 6:
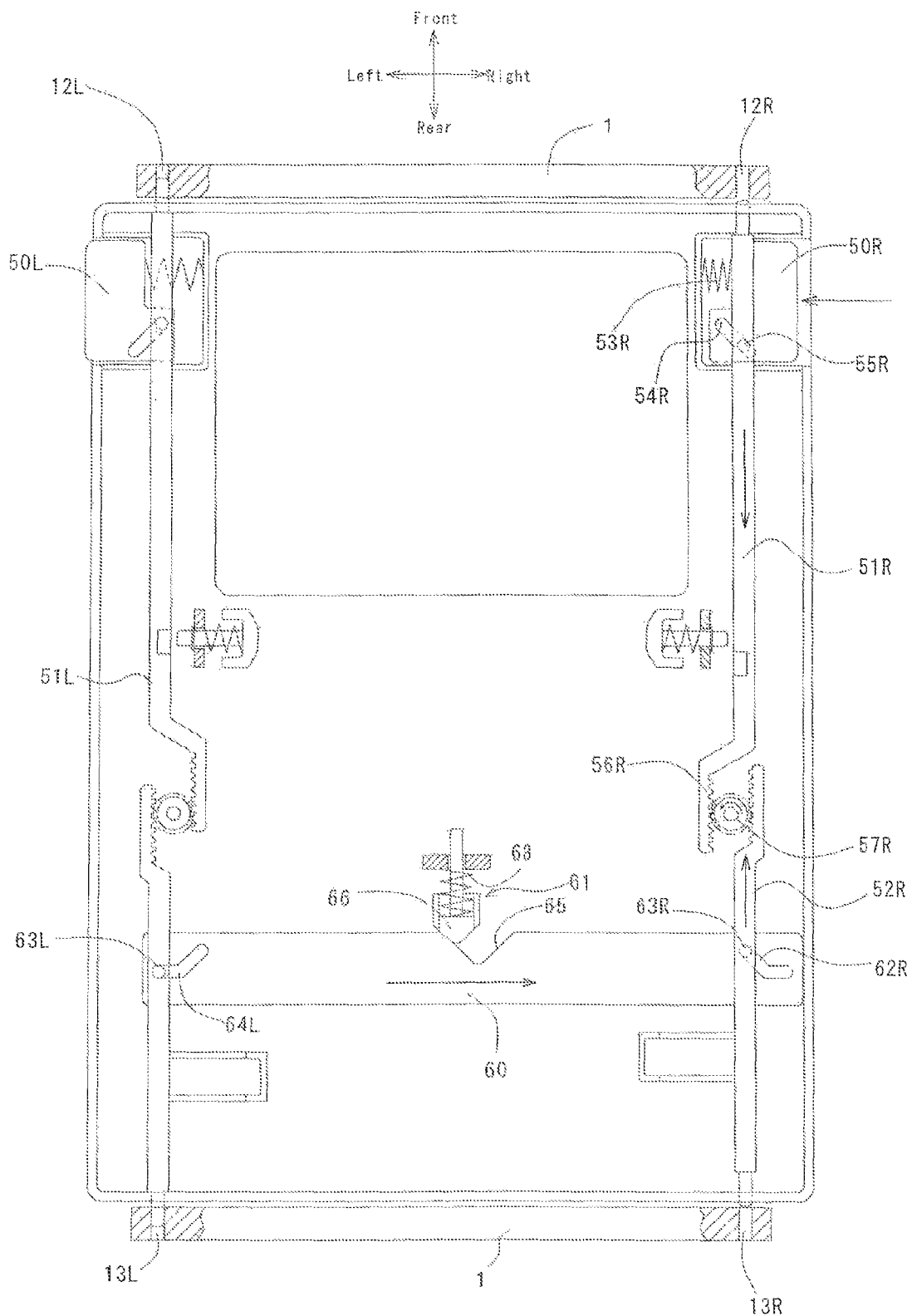
FIG. 6 is a planar diagram for illustrating the lower component of the lid's base member in the present console box according to Embodiment No. 1 under such a condition as the lid has swung to the left.
Figure 7:
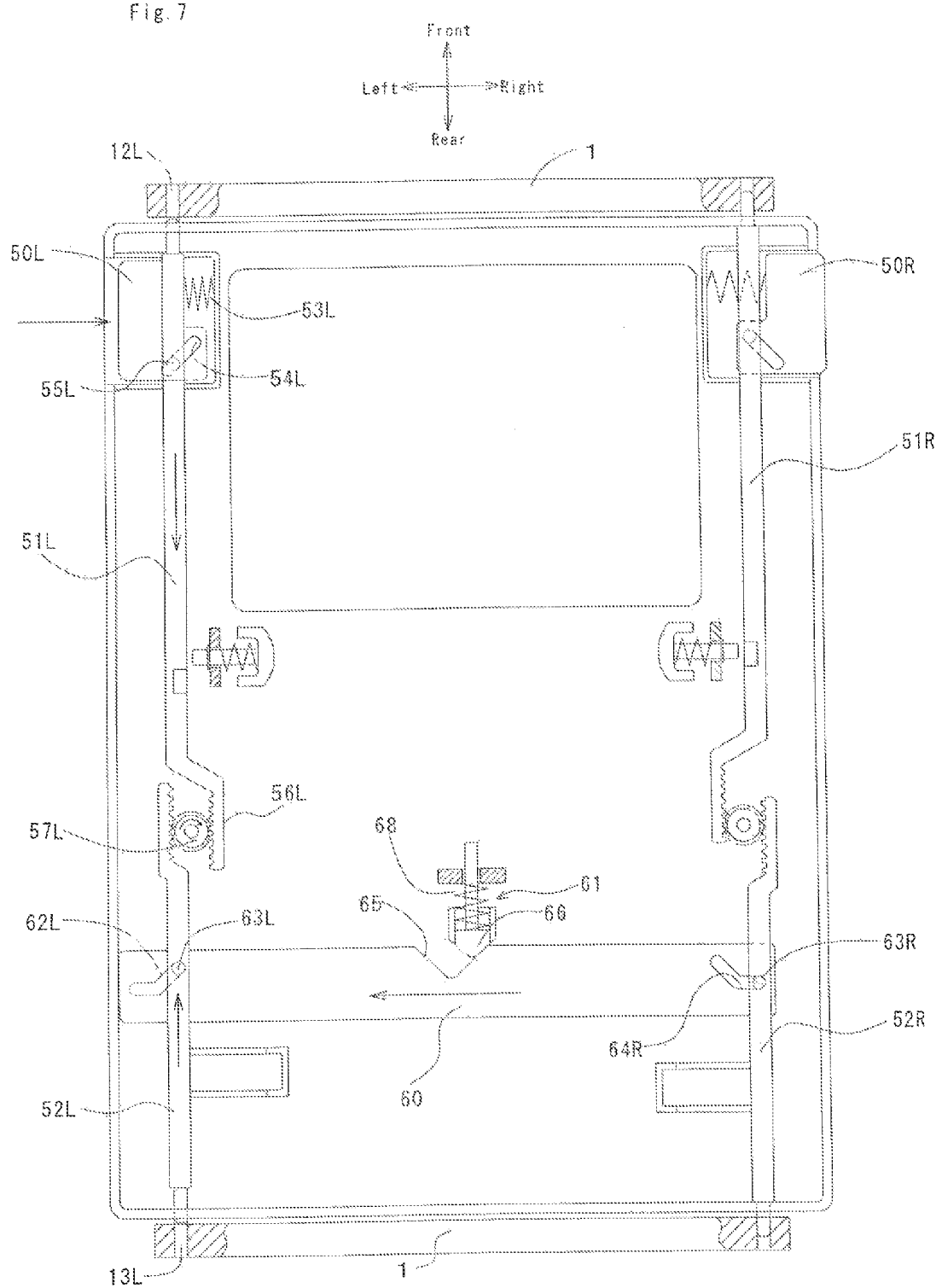
FIG. 7 is a planar diagram for illustrating the lower component of the lid's base member in the present console box according to Embodiment No. 1 under such a condition as the lid has swung to the right.

The base member 3 makes a double-stacked structure of a lower component 30 and an upper component 31. The lower component 30 and upper component 31 are fixed one another integrally. Moreover, the lower component 30 and upper component 31 are provided with a through hole on the front side, respectively, through hole which communicates with each other to make the opening 100. FIGS. 5 through 7 are a planar diagram, respectively, which illustrate the lower component 30 being viewed from above. The lower component 30 is provided with a link mechanism 5, which is symmetric with each other, at the right/left opposite ends, respectively. The link mechanisms 5 comprise push-button switches (50R, 50L) for swinging, front locking pins (51R, 51L), and rear locking pins (52R, 52L). The front locking pins (51R, 51L) engage with the switches (50R, 50L), respectively, and extend in the front/rear direction. The rear locking pins (52R, 52L) engage with the rear end of the front locking pins (51R, 51L) indirectly at the front end, respectively, and extend in the front/rear direction.

The switches (50R, 50L) for swinging are provided, with coil springs (53R, 53L), respectively. The coil spring 53R urges the switch 50R to the right direction, whereas the coil spring 53L urges the switch 50L to the left direction. Moreover, the switches (50R, 50L) are provided with slots (54R, 54L), respectively, which extend obliquely with respect to the front/rear direction, and with respect to the right/left direction.

The front locking pins (51R, 51L) are placed above the switches (50R, 50L) for swinging, respectively. Moreover, the front locking pins (51R, 51L) are provided with column-shaped engagement protrusions (55R, 55L). respectively, which protrude toward the switches (50R, 50L). The protrusions (55R, 55L) engage with the slots (54R, 54L), respectively. The front locking pins (51R, 51L) are provided, with front racks (56R, 56L) at the rear end, respectively. The front racks (56R, 56L) mesh with pinion gears (57R, 57L), respectively. The pinion gears (57R, 57L) also engage with rear racks (55R, 55L), with, which each of the rear locking pins (52R, 52L) is provided at the front end. The front locking pins (51R, 51L), and the rear locking pins (52R, 52L) are placed on an imaginary common axis, respectively. Moreover, the pinion gears (57R, 57L) have a not-shown built-in coil spring, respectively. One of the coil springs urges the pinion gear 57R clockwise in FIG. 5, whereas the other one of them urges the pinion gear 57L counterclockwise in FIG. 5.

Under such a condition as the lid 2 closes the box body 1, the pinion gear (57R, 57L) urge the front locking pins (51R, 51L) to engage their front ends with front locking holes (12R, 12L), with which the box body 1 is provided at the front end, respectively, as shown in FIG. 5, Moreover, the rear locking pins (52R, 52L) engage with rear locking holes (13R, 13L), with which the box body 1 is provided at the rear end, respectively.

The console box according to Embodiment No. 1 of the present invention comprising the above-described link mechanism 5 operates as hereinafter described. First of all, when a user tries to open the lid 2 from the driver's seat side, the user pushes the switch 50R for swinging as shown in FIG. 6. Then, the slot 54R guides the engagement protrusion 55R, so that the front locking pin 51R moves rearward. As a result, the front rack 56R rotates the pinion gear 51R counterclockwise. As being accompanied by the rotating pinion gear 57R, the rear rack 58R and rear locking pin 52R move forward. Thus, the engagement between the front end of the front locking pin 51R and the front locking hole 12R is disengaged, and the other engagement between the rear end of the rear locking pin 52R and the rear locking hole 13R is disengaged. As a consequence, the base member 3 becomes, together with the movable member 4, rotatable in the left direction about the front locking pin 51L and rear locking pin 52L serving as the axial center, and thereby the lid 2 opens as shown in FIG. 3.

When the user has canceled pressing the switch 50R while the lid 2 is swinging, or after it has fully swung, the coil spring 53R and pinion gear 57R urge the front locking pin 51R to move it forward and then return it to the initial state, and urge the rear locking pin 52L to move it rearward and then return it to the initial state. On the other hand, when the user tries to close the lid 2, the front locking pin 51R and rear locking pin 52R engage with the box body 1 so that the front locking pin 51R is pressed rearward and simultaneously therewith the rear locking pin 52R is pressed forward. Then, the engagements with the box body 1 are disengaged at positions where the front locking hole 12R and rear locking hole 13R are placed. As a result, the coil spring 53R and pinion gear 57R urge the front locking pin 51R and. rear locking pin 52R to engage them with the front locking hole 12R and rear locking hole 13R, respectively.

When a user tries to open the lid 2 from the navigator's seat side, the user pushes the switch 50L for swinging as shown in FIG. 7. Then, the slot 54L guides the engagement protrusion 55L, so that the front locking pin 51L moves rearward. As a result, the front rack 56L rotates the pinion, gear 57L clockwise. As being accompanied by the rotating pinion gear 57L, the rear rack 58L and rear locking pin 52L move forward. Thus, the engagement between the front end of the front locking pin 51L and the front locking hole 12L is disengaged, and the other engagement, between the rear end of the rear locking pin 52L and the rear locking hole 13L is disengaged. As a consequence, the base member 3 becomes, together with the movable member 4, rotatable in the right direction about the front locking pin 51R and rear locking pin 52R serving as the axial center, and thereby the lid 2 opens as shown in FIG. 2.

When the user has canceled pressing the switch 50L while the lid 2 is swinging, or after it has fully swung, the coil spring 53L and pinion gear 57L urge the front locking pin 51L to move it forward and then return it to the initial state, and urge the rear locking pin 52L to move it rearward and then return it to the initial state. On the other hand, when the user tries to close the lid 2, the front locking pin 51L and rear locking pin 52L engage with the box body 1 so that the front locking pin 51L is pressed rearward and simultaneously therewith the rear locking pin 52L is pressed forward. Then, the engagements with the box body 1 are disengaged at positions where the front locking hole 12L and rear locking hole 13L are placed. As a result, the coil spring 53L and pinion gear 57L urge the front locking pin 51R and rear locking pin 52R to engage them with the front locking hole 12L and rear locking hole 13L, respectively.

However, when a user pushes both of the switches (50R, 50L) for swinging inadvertently, the lid 2 might possibly come off from the box body 1 accidentally. Hence, the console box according to Embodiment No. 1 of the present invention further comprises a switcher for switching the swinging directions of the lid 2 so as to swing it alternately to the right, or to the left.

As illustrated in FIGS. 5 through 7, the switcher comprises a connecting rod 60, and a centering member 61. The connecting rod 60 connects the rear locking pin 52R with the rear locking pin 52L in a bridging manner, and engages with the centering member 61 at the central part. Moreover, the connecting rod 60 is provided with guide slots (62R, 62L), which extend obliquely with respect to the front/rear directions, and with respect to the right/left direction, at the right and left opposite ends, respectively. The guide slots (62R, 62L) engage with engagement protrusions (63R, 63L) that protrude from the rear locking pins (52R, 52L) respectively. In addition, the connecting rod 60 is provided with relief guide slots (64R, 64L) that keep extending from the rear end of the guide slots (62R, 62L) in the right/left direction, respectively. Moreover, the connecting rod 60 is provided with a concave-shaped cam dent 65 at the front end in the central part.

The centering member 61 comprises a head 66, and a shaft 67. The head 66 faces to the cam dent 65. A coil spring 68, which is wound around the shaft 67, presses the head 66 to the cam dent 65.

The thus constructed switcher 6 operates as hereinafter described. First of all, as illustrated in FIG. 6, when a user presses the switch 50R for swinging so that the rear locking pin 52R moves forward, the connecting rod 60 moves in the right direction because the engagement protrusion 63R moves forward while engaging with the guide slot 62R. At the left end of the connecting rod 60, the relief slot 64L guides the engagement protrusion 63L. Moreover, in the centering member 61, the cam dent 65, which moves in the right direction, presses the head 66 forward, so that the coil spring 68 stores an urging force therein.

Under the circumstance, the engagement protrusion 63L, which engages with the relief slot 64L, inhibits the rear locking pin 52L from moving. Accordingly, the user cannot push the switch 50L for swinging. Consequently, the front locking pin 51L and rear locking pin 52L do not move at all. Therefore, the lid 2 does not come off from the box body 1, because the front locking pin 51L and rear locking pin 52L engage with the box body 1 securely.

Then, when the user closes the lid 2, the front locking pin 51R moves forward, and the rear locking pin 52R moves rearward. As a result, the coil spring 68 urges the centering member 61 to go into the cam dent 65. Thus, the connecting rod 60 moves in the left direction, and then returns back to the neutral position shown in FIG. 5.

Moreover, as illustrated in FIG. 7, when a user presses the switch 50L for swinging so that the rear locking pin 52L moves forward, the connecting rod 60 moves in the left direction because the engagement protrusion 63L moves forward while engaging with the guide slot 62L. At the right end of the connecting rod 60, the relief slot 64R guides the engagement protrusion 63R. Moreover, in the centering member 61, the cam dent 65, which moves in the left direction, presses the head 66 forward, so that the coil spring 68 stores an urging force therein.

Under the circumstance, the engagement protrusion 63R, which engages with the relief slot 64R, inhibits the rear locking pin 52R from moving. Accordingly, the user cannot push the switch 50R for swinging. Consequently, the front locking pin 51R and rear locking pin 52R do not move at all. Therefore, the lid 2 does not come off from the box body 1, because the front locking pin 51R and rear locking pin 52R engage with the box body 1 securely, Then, when the user closes the lid 2, the front locking pin 51L moves forward, and the rear locking pin 52L moves rearward. As a result, the coil spring 68 urges the centering member 61 to go into the cam dent 65. Thus, the connecting rod 60 moves in the right direction, and then returns back to the neutral position shown in FIG. 5.

Next, descriptions will be made on a mechanism for sliding the movable member 4.

Figure 8:
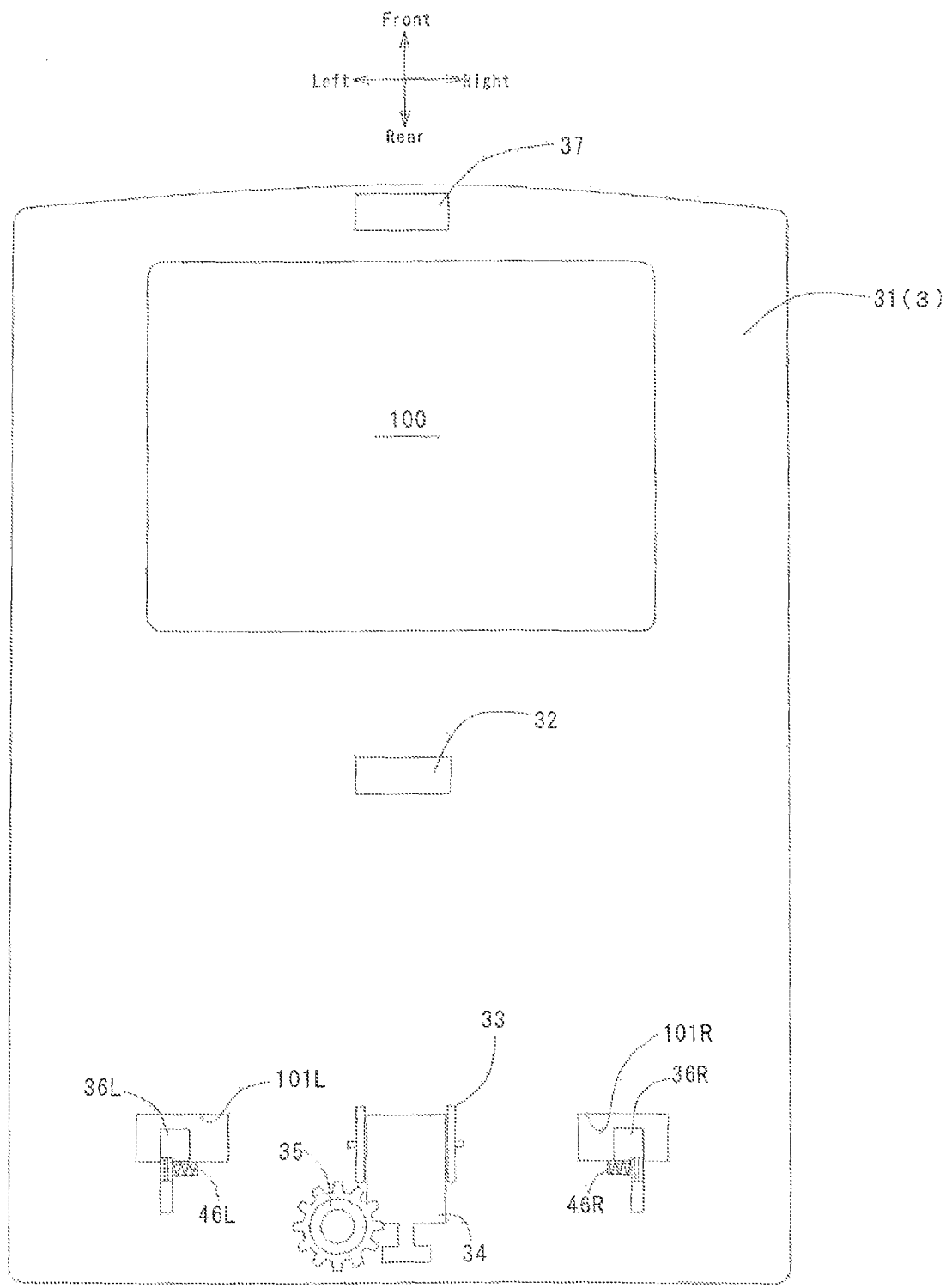
FIG. 8 is a planar diagram, for illustrating an upper component of the lid's base member in the present console box according to Embodiment No. 1.
Figure 9:
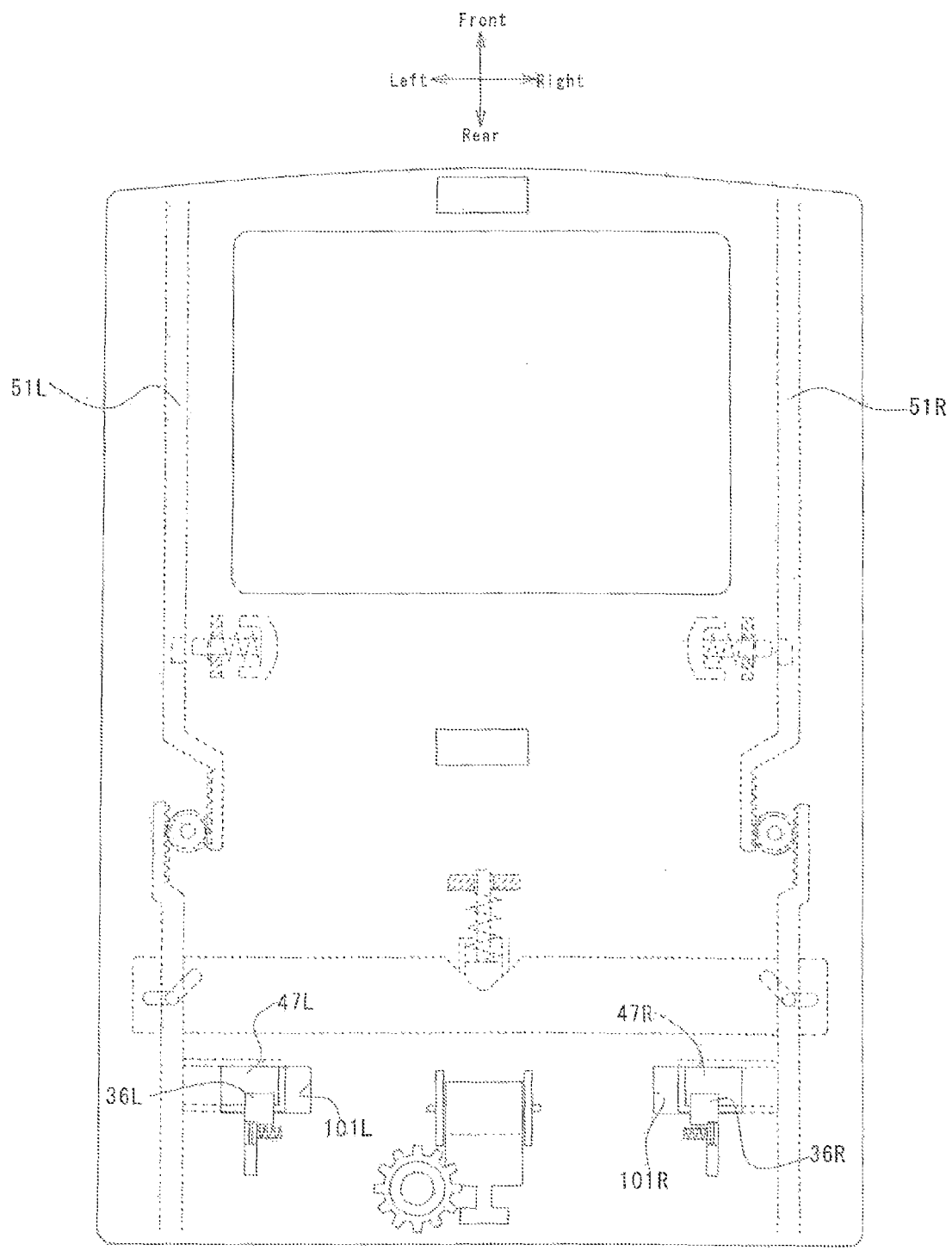
FIG. 9 is a planar diagram for illustrating the upper component of the lid's base member in the present console box according to Embodiment No. 1, and the lower component thereof under such a condition as they have been put in a stack.

FIG. 8 illustrates an outline planar diagram, in which the upper component 31 of the base member 3 is viewed from above. FIG. 9 illustrates a planar diagram in which the lower component 30 and upper component 31 are stacked and the lower component 30 is seen through. The upper component 31 is provided with a first stopper hole 37 in front of the opening 100, and is provided with a second stopper hole 32 at the rear of the opening 100. A bobbin 33 is fixed rotatably at the rear end of the upper component 31. The inner end of "CONSTON SPRING" 34 is fixed to the bobbin 33. The outer end of "CONSIGN SPRING" 34 is couple with the rear end of the bottom in the movable member 4. Moreover, a damper 35 is put in place at the rear end of the upper component 31, In addition, right/left paired stoppers (36R, 36L) are put in place at the back-face-side rear end of the upper component 31. Moreover, the upper component 31 is provided with paired openings (101R, 101L) that lap over the stoppers (36R, 36L). In addition, later described flanges (47R, 47L) appear inside the openings (101R, 101L).

Figure 10:
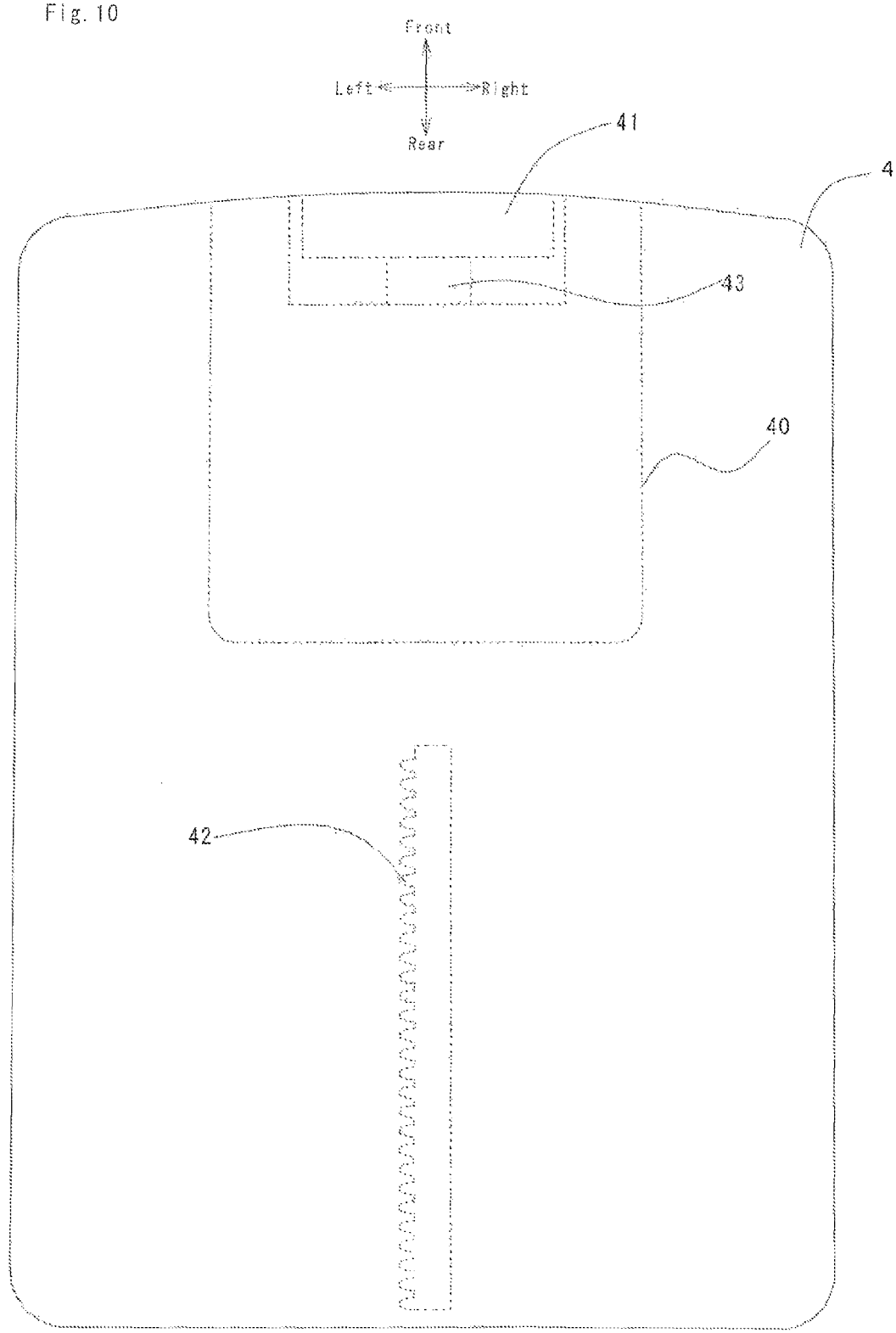
FIG. 10 is a planar diagram for illustrating a movable member of the lid in the present, console box according to Embodiment No. 1.

FIG. 10 illustrates a planar diagram in which the movable member 4 is viewed from above. A seat 40 is fixed on the back-face side of the movable member 4. A sliding button 41 is retained onto the seat 40. Moreover, the back-face side of the movable member 4 is provided with a rack 42. The rack 42 extends in the front/rear direction, and meshes with the damper 35 with which the upper component 31 is provided.

The movable member 4 is put in place on the top of the upper component 31, and is made slidable with respect to the upper component 31 by not-shown rails. When the movable member 4 slides rearward, "CONSIGN SPRING" 34 stores an urging force therein. On the contrary, when the movable member 4 slides forward, "CONSIGN SPRING" 34 urges the movable member 4 to slide it automatically, however, the movable member 4 slides forward under a decelerated condition because the rack 42 meshes with the damper 35.

Figure 11:
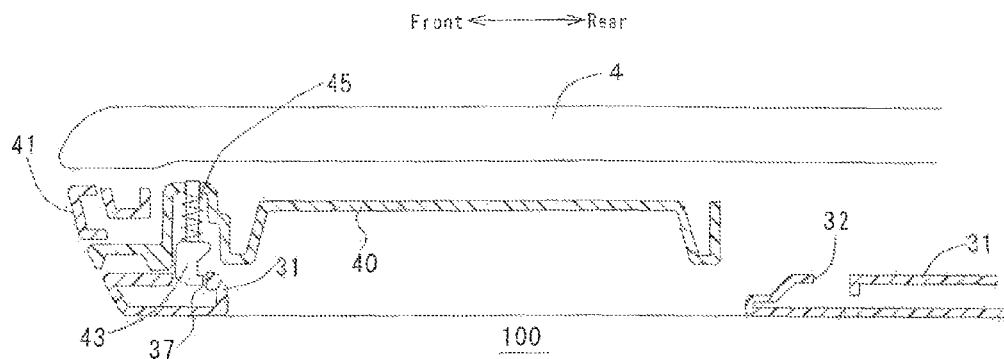
FIG. 11 is a major cross-sectional diagram for illustrating a sliding lock unit in the present console box according to Embodiment No. 1.
Figure 12:
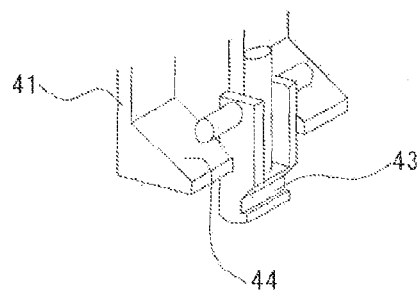
FIG. 12 is a major perspective diagram for illustrating the sliding lock unit in the present console box according to Embodiment No. 1.

As illustrated in FIG. 11, the seat 40 is fixed, at the back-face-side front end of the movable member 4. The sliding button 41 is retained at the front end of the seat 40 so that it is capable of going into and coming out of the front end. Moreover, a sliding lock 43 is retained onto the seat 40 so that it is capable of moving in the up/down direction. As illustrated in FIG. 12, the sliding button 41 is provided with a tapered face 44 that engages with the sliding lock 43. Thus, pressing the sliding button 41 leads to ascending the sliding lock 43. Moreover, a spring 45 urges the sliding lock 43 downward.

Figure 13:
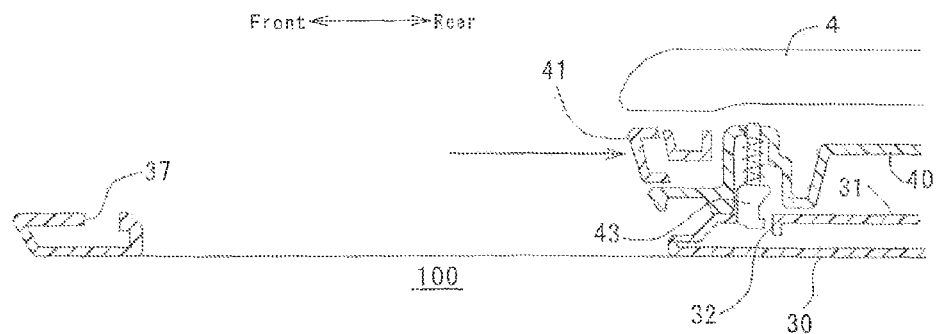
FIG. 13 is another major cross-sectional diagram for illustrating the sliding lock unit in the present console box according to Embodiment No. 1.

In such a circumstance as the movable member 4 is not sliding, the movable member 4 cannot slide because the sliding lock 43 engages with the first stopper hole 37 with which the upper component 31 is provided at the front end. In order to have the movable member 4 slide from that circumstance, a user first presses the sliding button 41 rearward. Then, the engagement between the sliding lock 43 and the first stopper hole 37 is disengaged because the sliding lock 43 ascends. As a result, the movable member 4 becomes slidable. Moreover, when the user slides the movable member 4 more rearward against an urging force, which the "CONSIGN SPRING" 34 exerts, as well as a resistance force, which the damper 35 exerts, the movable member 4 is inhibited from sliding (see FIG. 13), because the sliding lock 43 engages with the second stopper hole 32 with which the upper component 31 is provided, in the rear. Under the condition, the user can make use of the storage section 10, or the tray 11, because the opening 100 in the base member 3 is exposed, In order to close the movable member 4, the user pushes the sliding button 41 rearward again. If so, the sliding lock 43 ascends to detach from the second stopper hole 32. Accordingly, when the user cancels pressing the sliding button 41, "CONSTON SPRING" 34 urges the movable member 4 to advance it forward automatically. Consequently, the sliding lock 43 engages with the first stopper hole 37 so that the movable member 4 stops sliding.

Incidentally, when the user should have pushed one of the switches (50R, 50L) inadvertently while the movable member 4 is sliding, or after it has fully slid, the base member 3 might have possibly swung accidentally. If such is the case, the movable member 4 is poor in the appearance, because the back-face side becomes visible to the user. Accordingly, it might be necessary to provide the console box according to Embodiment No. 1 of the present invention with a cover for masking, for instance. Consequently, the quantity of component parts might possibly have enlarged. Moreover, since the movable member 4, which has fully slid, should have been accidently subjected to loads from directions other than the ordinary directions, the movable member 4 might possibly have suffered from a fear of being broken.

Hence, the console box according to Embodiment No. 1 of the present invention comprises a restrictor for restricting the link mechanisms 5 from being actuated when the movable member 4 is sliding, and when, the movable member 4 has fully slid. The restrictor will be hereinafter described.

As illustrated in FIG. 5, the lower component 30 is provided with right/left paired sliding locking pins (38R, 38L) that are retained at positions near the rear end of the opening 100, The sliding locking pins (38R, 38L) are formed as a curved-face configuration at the leading end, respectively. A spring 39R urges the sliding lock pin 38R in the left direction in the drawing. A spring 39L urges the sliding lock pin 38L in the right direction in the drawing. A distance between the leading end of the sliding lock pin 38R and the leading end of the sliding lock pin 38L is designed so as to be slightly shorter than a length of the seat 40 in the right/left direction.

Figure 14:
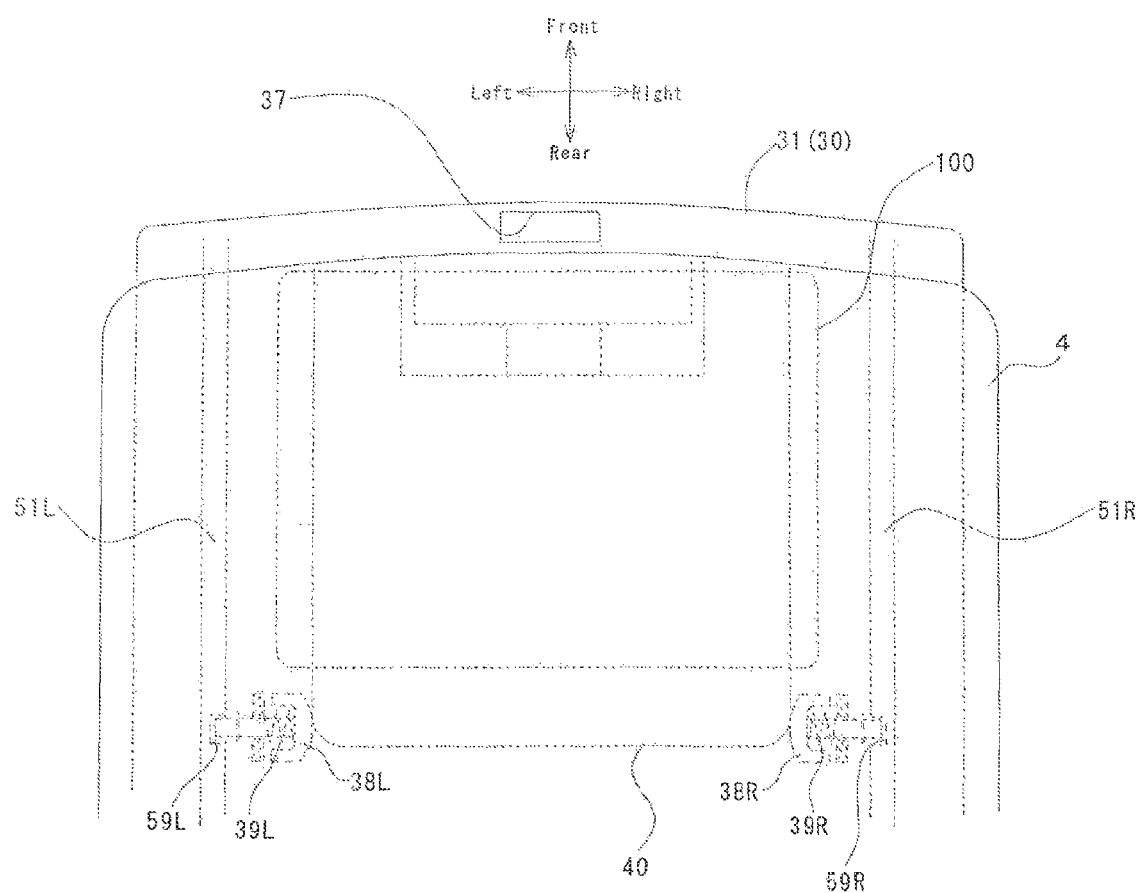
Figure 15:
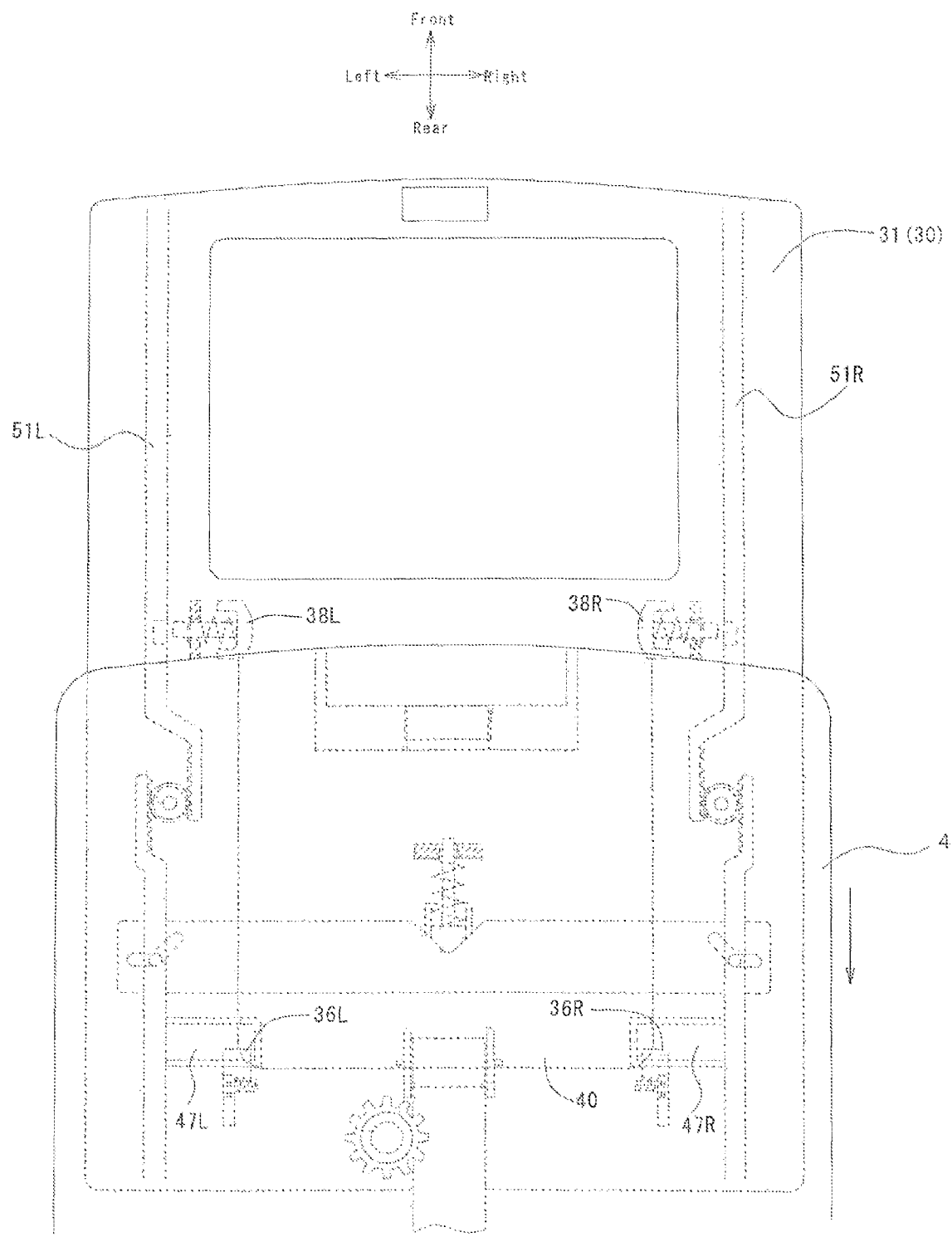

When a user pushes a sliding button 41, the movable member 4 starts sliding rearward. Then, as illustrated in FIG. 14, the seat 40 interferes with the sliding locking pins (38R, 38L) at the rear end. Accordingly, the sliding locking pin 38R moves in the right direction to engage at the shaft with a locking hole 59R, with which the front locking pin 51R is provided, and simultaneously therewith the sliding locking pin 33L moves in the left direction to engage at the shaft with a locking hole 59L with which the front locking pin 51L is provided. Consequently, the engagements inhibit the front locking pins (51R, 51L) from moving. Therefore, the base member 3 does not swing to the right and left at all, because the front locking pins (51R, 51L) are inhibited from moving so that the switches (50R, 51L) for swinging are inhibited, from moving.

Figure 16:
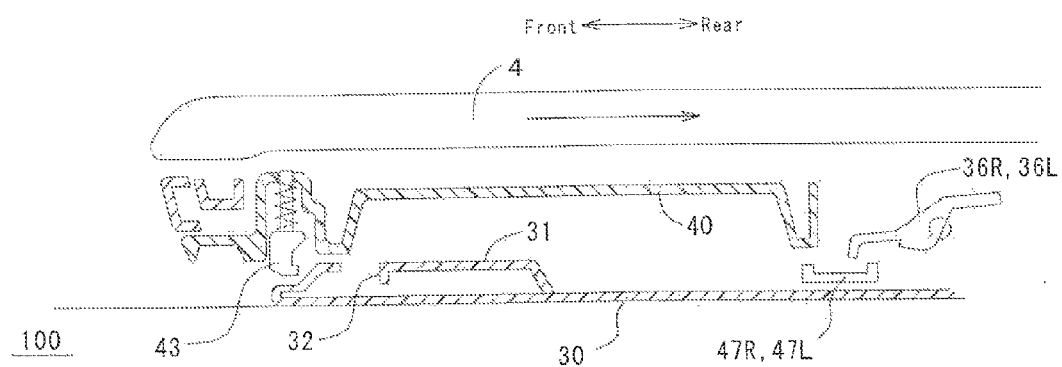
FIG. 16 is a major cross-sectional diagram, for illustrating how the second restrictor operates in the present console box according to Embodiment No. 1.

When the movable member 4 has fully slid rearward to expose the opening 100 as a whole, however, the seat 40 might possibly have been released from the engagements with the sliding locking pins (38R, 38L), so that, the sliding locking pins (38R, 38L) might possibly have been disengaged from the engagements with the front locking pins (51R, 51L). In order to avoid such a situation, the upper component 31 is provided with right/left paired engagement elements (36R, 36L) that are retained onto the upper component 31 swingably in the up/down direction, as shown in FIGS. 8, 9 and 16. Coil springs (46R, 46L) urge the engagement elements (36R, 36L) so as to direct their front ends upward, respectively. Moreover, the rear locking pins (52R, 52L) are provided with flanges (47R, 47L) that protrude toward the inner side in the right/left direction, respectively. In addition, the leading ends of the engagement elements (36R, 36L) are designed to be present at positions, which face to the flanges (47R, 47L) by way of the openings (101R, 101L), respectively.

Figure 17:
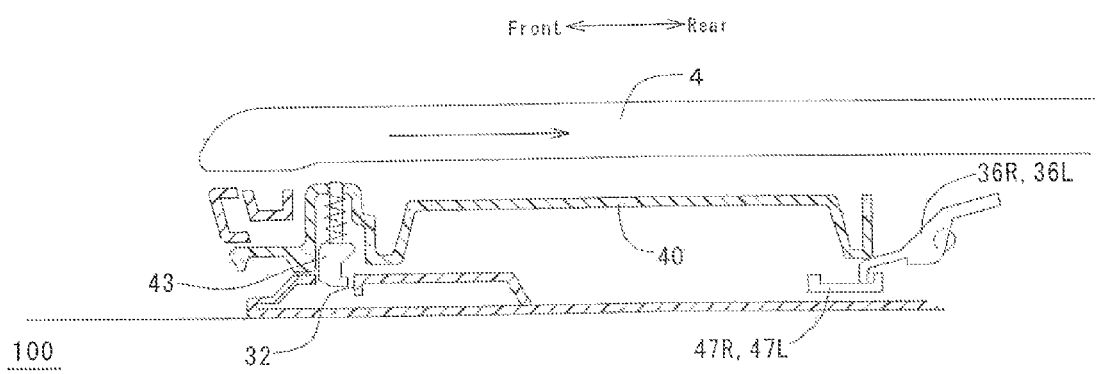
FIG. 17 is another major cross-sectional diagram for illustrating how the second restrictor operates in the present console box according to Embodiment No. 1.

While the movable member 4 slides rearward to expose the opening 100 as a whole, the movable member 4 is put in a situation shown in FIG. 17 via another situation shown in FIG. 16. That is, the rear end of the seat 40 is placed at a position that faces to the flanges (47R, 47L). Thus, the seat 40 interferes with the front end of each, of the engagement elements (36R, 36L) at the rear end. Then, the rear end of the seat 40 presses the front end of each of the engagement elements (36R, 36L) downward, Accordingly, the engagement elements (36R, 36L) pass through, the openings (101R, 101L) that are formed in the upper component 31, and then engage with the flanges (47R, 47L), respectively. Consequently, the thus engaged engagement elements (36R, 36L) and flanges (47R, 47L) inhibit the rear locking pins (52R, 52L) from moving. Therefore, the rear locking pins (52R, 52L), which are inhibited from moving, inhibit a user from pressing the switches (50R, 50L) for swinging. All in all, the base member 3 can hardly swing to the right and left at all.

Embodiment No. 2

In the console box according to Embodiment No. 1 of the present invention, it is preferable to decelerate the lid 2 in the closing speed when a user closes the lid 2 from the circumstance in which the user has fully swung the lid 2 in the right direction, or in the left direction, to open the storage section 10. Such, a construction is preferable because the faster the lid 2 swings the louder noises it produces when it collides with the box body 1.

When a lid is constructed to open in one of the right and left directions alone, it is possible to employ a decelerator, which utilizes a gear mechanism and a damper, around the swing shaft. In such a two-way-opening structure like Embodiment No. 1, however, a drawback might have possibly arisen in view of space, or in view of strength, because a decelerator should have been disposed around the right and left swing shafts, respectively.

Figure 18:
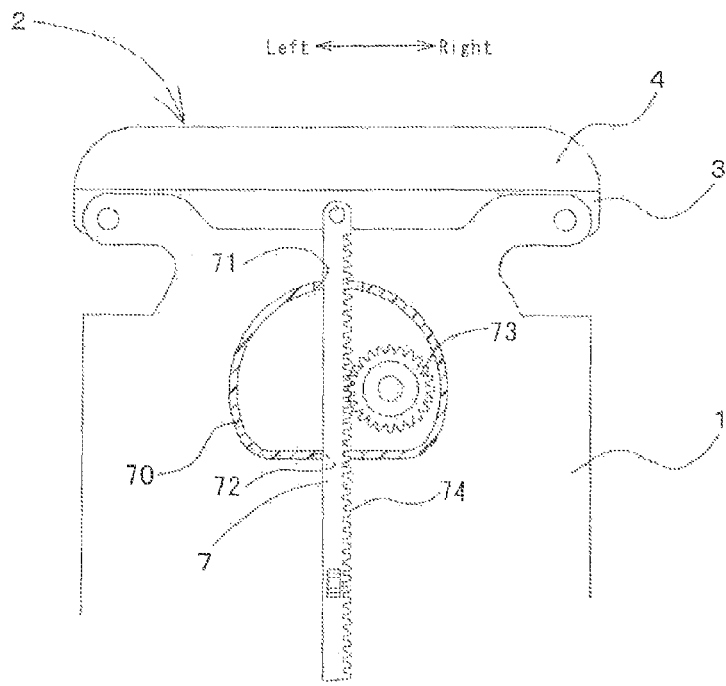
FIG. 18 is a major side-face diagram for illustrating a decelerator in a console box according to Embodiment No. 2 of the present invention.

Hence, a console box according to Embodiment No. 2 of the present invention further comprises an arm 7 that, connects the rear end of the base member 3 with the box body 1, as shown in FIG. 18, Since the other constituent elements are the same as those of the console box according to Embodiment No. 1, distinct settings will be hereinafter described while using the same reference numerals as those used in Embodiment No. 1.

Onto the rear wall of the box body 1, an arm case 70 is installed rotatably. The arm case 70 is formed as a tabular configuration, and is provided with a pair of through holes (71, 72), which are placed on an imaginary common straight line, in the peripheral wall. Moreover, a damper 73, which is provided with a pinion gear around the circumference, is fixed onto the arm case 70. In addition, the arm 7 is provided with a rack 74 on one of the side faces. The arm 7 is retained rotatably onto the base member 3 at one of the opposite ends, and is first inserted into the through hole 71 and then into the through hole 72 in this order on the other opposite-end side. Moreover, the rack 74 meshes with the pinion gear around the damper 73.

Figure 19:
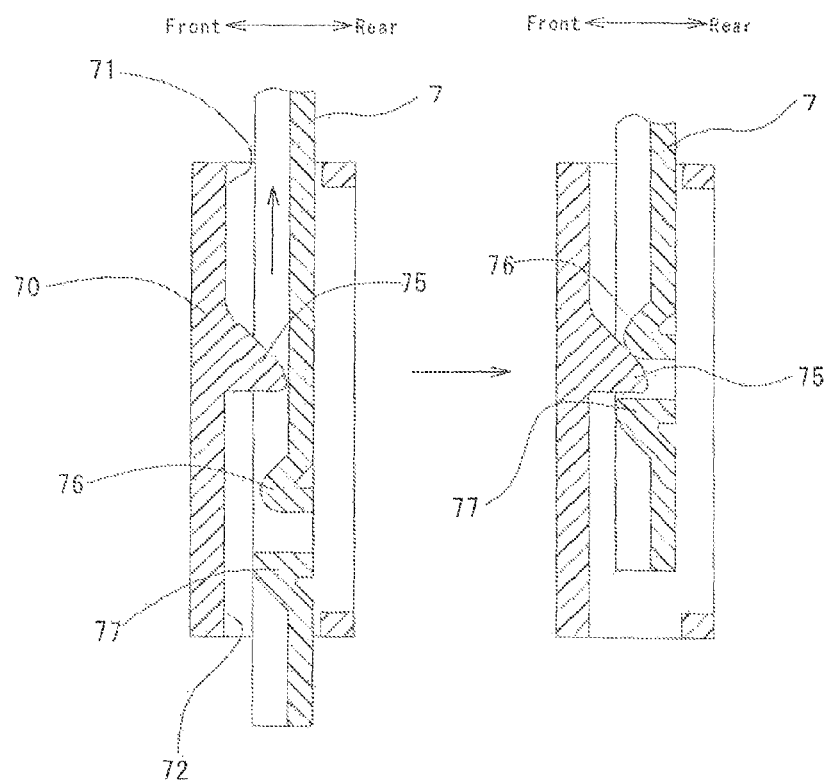
FIG. 19 is a major cross-sectional diagram for illustrating how the decelerator operates in the present console box according to Embodiment No. 2.

As illustrated in FIG. 19, the arm case 70 is further provided with a protrusion 75 that protrudes rearward from the bottom face. Moreover, the arm 7 is provided with a claw 76 and a stopper 77 on the other opposite-end side. The claw 7 6 is capable of elastically deforming forward and rearward. The stopper 77 is placed beneath the claw 76.

Figure 20:
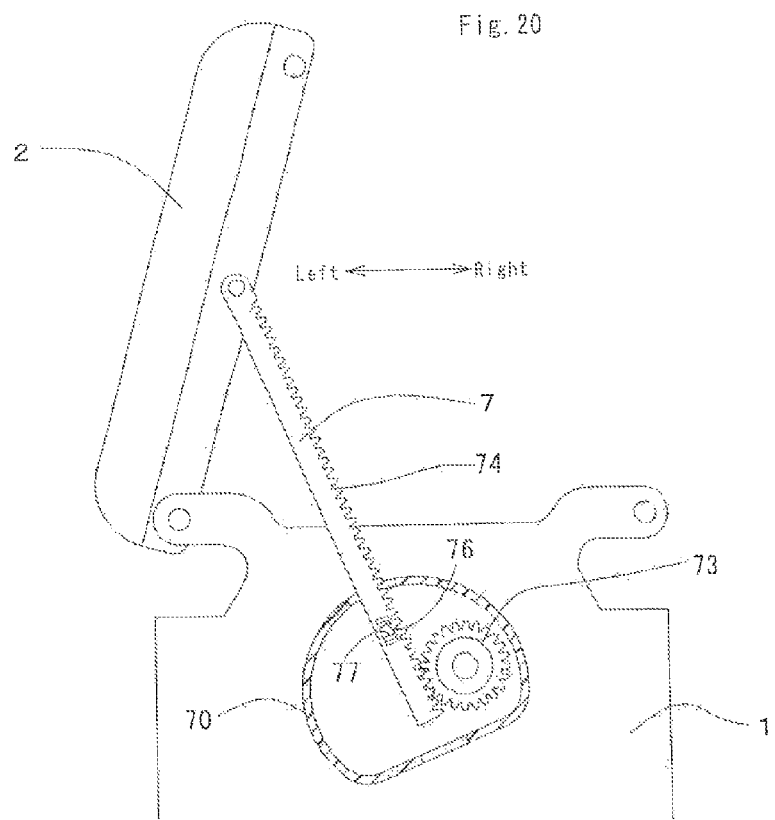
FIG. 20 is a major side-face diagram for illustrating how the decelerator operates in the present console box according to Embodiment No. 2.

In the console box according to Embodiment No. 2 of the present invention being constructed as described, above, the arm 7 rotates, as shown in FIG. 20, about one of the ends serving as the center, at which it is installed onto the rear wall of the box body 1, when a user or operator swings the lid 2 (i.e., the base member 3 and movable member 4) in the left direction to open the storage section 10. As being accompanied by the thus rotating arm 7, the arm case 70 rotates in the left direction, whereas the arm 7 moves obliquely to the upper left within the arm case 70. Since the claw 76 goes over the protrusion 75 as shown in FIG. 19 when, the arm 7 approaches the limit of swinging, the user can perceive the sense of clicking. After the claw 76 has gone over the protrusion 75, the arm 7 is inhibited, from moving because the stopper 77 comes into contact with the protrusion 75. As a result, the lid 2 stops swinging.

In addition, since the arm 7 moves obliquely to the lower right so that the claw 76 goes over the protrusion 75, a user or operator can also perceive the sense of clicking when he or she closes the lid 2. Moreover, since the rack 74 meshing with, the damper 73 decelerates the lid 2 in the closing speed, the lid 2 approaches the box body 1 slowly. Thus, it is possible to prevent the lid 2 from, colliding with the box body 1 to generate noises.

Figure 21:
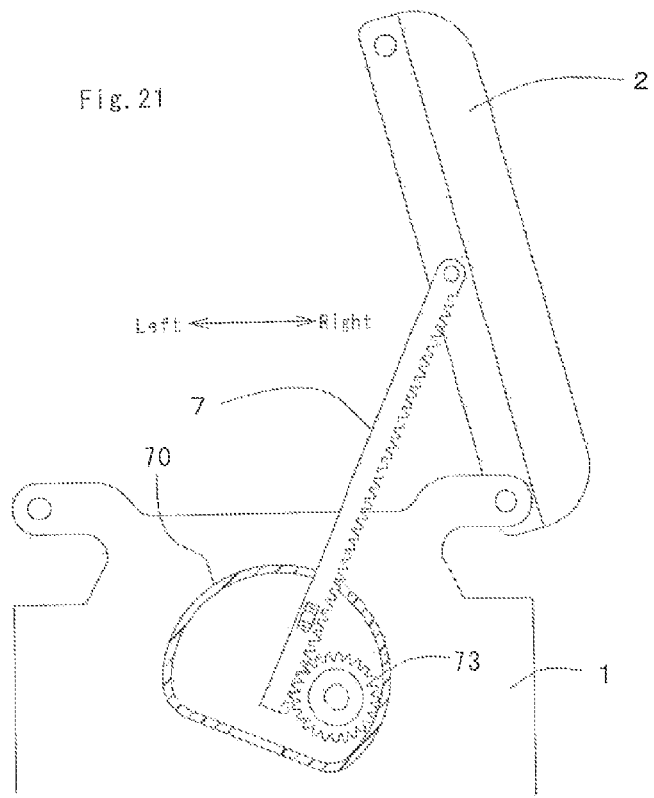
FIG. 21 is another major cross-sectional diagram for illustrating how the decelerator operates in the present console box according to Embodiment No. 2.

Descriptions will not be made herein however on how the lid 2 operates when a user or operator swings the lid 2 in the right direction to open the storage section 10 as shown, in FIG. 21, because the lid 2 operates in the same manner as described, above in this instance as well. Note that, when the lid 2 is closed as shown in FIG. 18, the arm 7 does not at ail interfere with the upper-side sliding movable member 4, because the arm 7 is installed onto the lower-side base member 3 that does not slide at all.

Moreover, the console box according to Embodiment No. 2 of the present invention exhibits upgraded durability, because the resistance, which the protrusion 75 exerts to the claw 76 when the claw 76 goes over the protrusion 75, inhibits the swinging lid 2 from flip-flopping. In addition, disposing an extra gear that meshes with the rack 74 or clamper 73, and providing the extra gear with a wound or coiled spring lead to enabling the lid 2 to swing automatically by the urging wound or coiled spring.

Embodiment No. 3

In the console boxes according to Embodiment Nos. 1 and 2 of the present invention, the direction of pressing the sliding button 41, and the direction of sliding the movable member 4 to open coincide with each other. Moreover, in order to prevent the movable member 4 from giving a user the sense of bumping, it is common to construct the movable member 4 so that it can slide slightly excessively beyond the locking position that results from the engagement between the sliding lock 43 and the second stopper hole 32. Consequently, when a user presses the sliding button 41 in order to try to slide the movable member 4 forward at the slid-open position, the sliding lock 43, which has been disengaged from, the engagement with the base member 3, slides slightly excessively, together with the movable member 4. Under the circumstance, if the user cancels pressing the sliding button 41 inadvertently, the sliding lock 43 might possibly have reengaged with the second stopper hole 32 accidentally to stop the movable member 4 from moving when "CONSTON SPRING" 34 moves the movable member 4 automatically.

Hence, the console box according to Embodiment No. 3 of a present invention further comprises a circumventer for circumventing the following situations the sliding lock 43 reengages with the second stopper hole 32 when a user presses the sliding button 41 at the slid-open position, at which the entire opening 100 is exposed, to cancel the locking of the base member 3 by the sliding lock 4 3 and subsequently he or she cancels the pressing of the sliding button 41 inadvertently. Since the other constituent elements are the same as those of the console box according to Embodiment No. 1, distinct settings will be hereinafter described while using the same reference numerals as those used in Embodiment No. 1.

Figure 22:
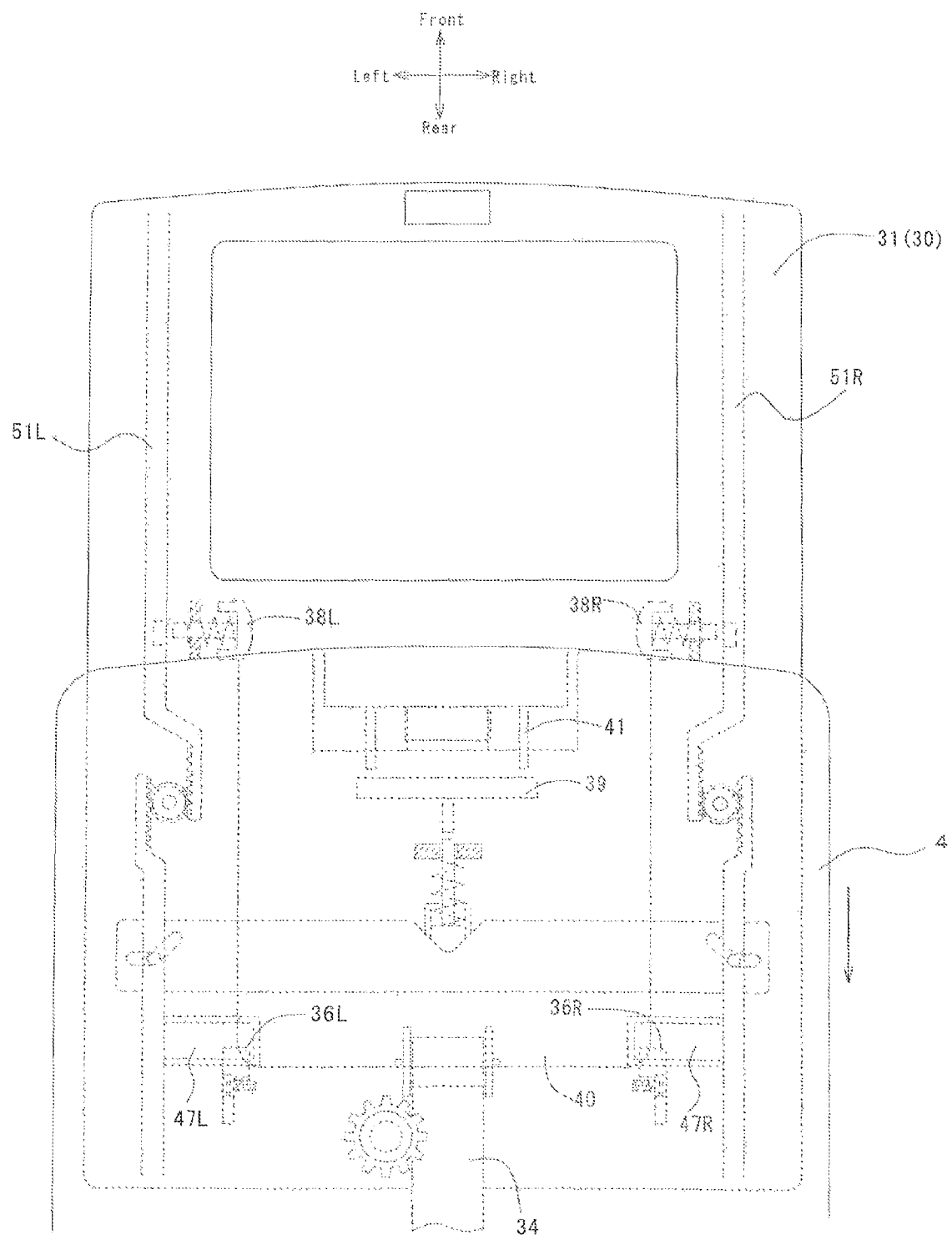
FIG. 22 is a major planar diagram for illustrating a lid in a console box according to Embodiment No. 3 of the present invention.
Figure 23:
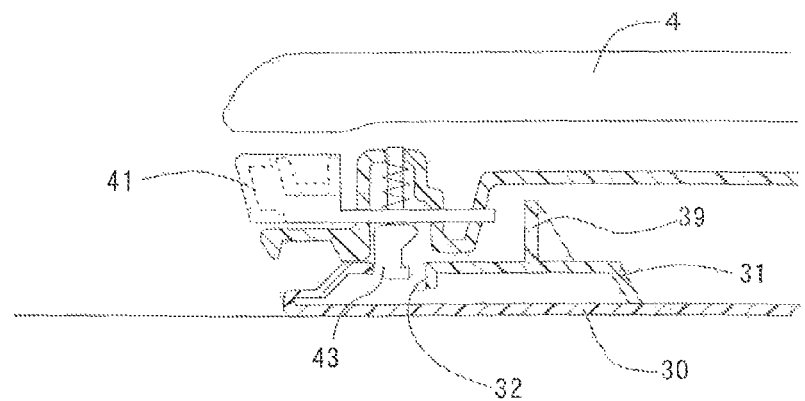
FIG. 23 is a major cross-sectional diagram for illustrating how a circumventer operates in the present console box according to Embodiment No. 3.
Figure 24:
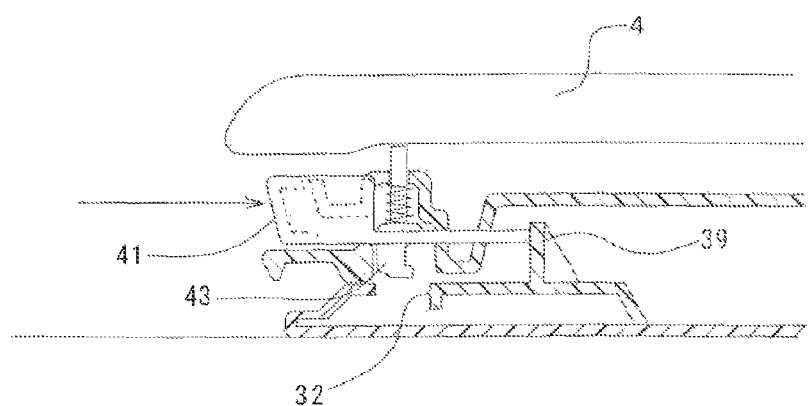

FIGS. 22 and 23 illustrate the console box according to Embodiment No. 3 of the present invention in a planar diagram, and in a cross-sectional diagram, respectively. "CONSIGN SPRING" 34 urges the sliding lock 43 to come into contact with the front-end face of the second stopper hole 32, as shown in FIG. 23. Behind the second stopper hole 32, a wall 39, which does not exist in Embodiment Nos. 1 and 2, is installed upright on a surface of the upper component 31. A distance from the rear-end face of the sliding button 41 to the wall 39 is designed to be 5 mm. Under the circumstance, when a user presses the sliding button 41 rearward, the sliding button 41 moves by a stroke of 5 mm, so that the sliding button 41 comes into contact with the wall 39 at the rear end eventually, as shown in FIG. 24. In that situation, the sliding lock 43 has come out from the second stopper hole 31 completely.

Figure 25:
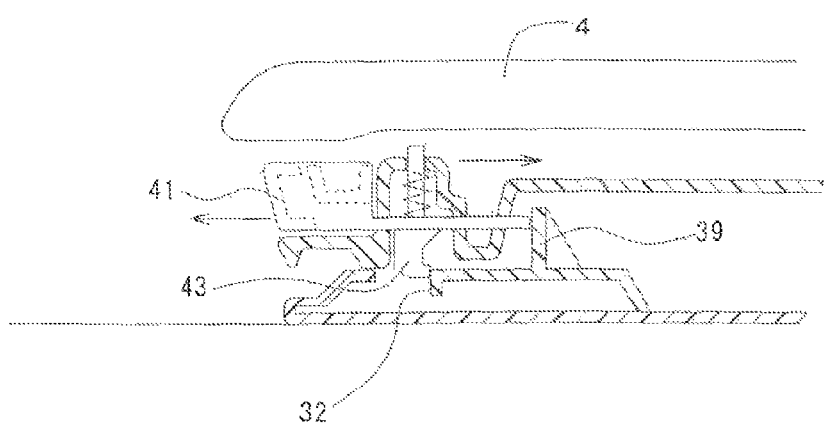
FIG. 25 is still another major cross-sectional diagram for illustrating how the circumventer operates in the present console box according to Embodiment No. 3.

On this occasion, an interval of 3 mm exists between the rear-end face of the sliding lock 43 and the rear-end face of the second stopper hole 32, so that the interval makes an overstroke for the movable member 4 by that extent. That is, the movable member 4 slides rearward by 3 mm, bat the sliding button 41 cannot move because the rear end comes into contact with the wall 39. Accordingly, the sliding button 41 comes to move forward only by 2 mm, as shown in FIG. 25, against the pressing by the user. Consequently, when the user cancels pressing the sliding button 41 inadvertently under that condition, a moving magnitude of 5 mm is required that the sliding lock 43 come off from the engageable range of the second stopper hole 32 in Embodiment Nos. 1 and 2. On the other hand, in the console box according to Embodiment No. 3 of the present invention, a moving magnitude of 3 mm alone suffices in order to have the sliding lock 43 come off from the engageable range of the second stopper hole 32. Therefore, it is possible to prevent, the sliding lock 43 from reengaging with the second stopper hole 32.

In short, the console box according to Embodiment No. 3 of the present invention is better in terms of the operability in sliding the movable member 4, because the circumventer makes it possible to avoid the accidental reengagement between the sliding lock 43 and the second stopper hole 32 when a user presses the sliding button 41 at the slid-open position, to cancel the locking of the movable member 4 by the sliding lock 43 and subsequently he or she cancels the pressing of the sliding button 41 inadvertently.

Having now fully described the present invention, it will be apparent to one of ordinary skill in the art that many changes and modifications can be made thereto without departing from the spirit or scope of the present invention as set forth herein including the appended claims.

What is claimed is:

1. A two-way-opening storage box, comprising:
a box body with a storage section being provided therein, the storage section has an opposite-end side and an other opposite-end side, the opposite-end side and the other opposite-end side are on opposite sides of the storage section from each other in first directions, the box body has opposite ends that are opposite from each other in a second direction, the second direction differs from the first directions;
a lid that swings in relation to the box body to open and close the storage section alternately from the opposite-end side of the storage section, and from the other opposite-end side thereof, wherein the first directions are directions in which the lid swings in relation to the box body to alternately open the opposite-end side of the storage section and the other opposite-end side thereof, the first directions are one of right/left directions and front/rear directions with respect to the box body, and the second direction is orthogonal to the first directions;
the lid includes a base member that covers the storage section, and a movable member that covers the base member, the base member has first opposite ends opposite from each other in the second direction;
a link mechanism disposed between the first opposite ends of the base member of the lid, the link mechanism further being disposed between the opposite ends of the box body, the link mechanism selectively swings open the lid in the first directions in relation to the box body alternately from the other opposite-end side to the opposite-end side of the storage section, and from the opposite-end side to the other opposite-end side of the storage section;
the movable member is slidably retained onto the base member, the movable member slides on the base member in the second direction; and
a restrictor disposed in at least one of the base member and the movable member, the restrictor restricts the link mechanism from being actuated under such a condition as the movable member has fully slid, and under such another condition as the movable member is sliding, wherein
the link mechanism comprises a push-button switch that swings a front locking pin and a rear locking pin,
the push-button switch is disposed in the base member of the lid,
the front locking pin engages with the push-button switch and the front locking pin extends in the second direction,
the rear locking pin extends in the second direction,
each of the front locking pin and the rear locking pin further engages with a locking hole that is disposed respectively in the box body,
the front locking pin and the rear locking pin move toward one another and disengage from the locking hole, when the push-button switch is pressed, the restrictor is disposed in the base member of the lid, and engages with the movable member, thereby restricting the front locking pin and rear locking pin from moving, the base member further includes second opposite ends which are opposite from each other in the first directions, the base member is provided with the restrictor at the second opposite ends, respectively, the restrictor comprises a sliding locking pin that enters a bore, the bore is disposed in at least one of the front locking pin and the rear locking pin when being pressed by the movable member of the lid.

2. The two-way-opening storage box according to claim 1 further comprising a decelerator being disposed at one of the first opposite ends of the base member and at one of the opposite ends of the box body, the decelerator decelerates a moving speed of the lid that swings in a closing direction.

3. The two-way-opening storage box according to claim 2, wherein the decelerator comprises:

an arm that has opposite ends, one of the opposite ends of the arm being retained rotatably onto a substantial middle in one of the first opposite ends of the base member;

an arm case retained rotatably onto a substantial middle in one of the opposite ends of the box body, the arm case accommodates the other one of the opposite ends of the arm therein; and a damper disposed in the arm case, the damper engages with the arm, thereby decelerating a moving speed of the arm.

4. The two-way-opening storage box according to claim 1, wherein:

the movable member of the lid includes a sliding lock, and a sliding button, the sliding lock engages with the base member of the lid at a slid-close position at which the movable member covers the storage section in the box body, the sliding lock engages with the base member at a slid-open position at which the movable member opens the storage section partially in order to restrict the movable member from sliding at the slid-close position and at the slid-open position, the sliding button releases the sliding lock from locking the movable member; and the two-way-opening storage box further comprises a circumventer that releases the sliding lock from locking the movable member when the sliding button is pressed at the slid-open position, thereby circumventing the sliding lock from reengaging with the base member when the pressed sliding button is subsequently released from the pressing.

5. The two-way-opening storage box according to claim 4, wherein:

the sliding lock detaches from a locking bore, with which the base member of the lid is provided, as the sliding button is pressed, the sliding lock thereby being released from locking with the movable member of the lid;

the movable member slides at the slid-open position by a predetermined overstroke in the second direction;

the base member includes a wall with which the sliding button comes into contact directly or indirectly; and the sliding button moves at the slid-open position by a magnitude, which is greater than the overstroke of the movable member, from a time when pressing the sliding button is started until another time when the sliding button comes into contact with the wall.

6. The two-way-opening storage box according to claim 1 comprising two of the link mechanisms being disposed to extend between the first opposite ends of the base member, the link mechanisms further being disposed to extend between the opposite ends of the box body, in the second direction.

7. The two-way-opening storage box according to claim 1, further comprising a switcher for selectively moving the lid back and forth in the first directions, the switcher including: a connecting member; and a centering member;

the connecting member is connected with the link mechanism, the connecting member obliquely guides the link mechanism with respect to the first directions, the connecting member obliquely guides the link mechanism with respect to the second direction, and the connecting member inhibits the lid from moving in the second direction; and the centering member comes into contact with the connecting member, and the centering member urges the connecting member back and forth in the second direction.

8. The two-way-opening storage box according to claim 1, the lid further comprising paired engagement elements, wherein, in the condition that the movable member has fully slid, the engagement elements engage with the rear locking pin, to thereby prevent the push-button switch from being pressed.

* * * * *